United States Patent
Uemoto et al.

(10) Patent No.: US 10,715,897 B2
(45) Date of Patent: Jul. 14, 2020

(54) SPEAKER UNIT, ELECTRONIC EQUIPMENT AND MOBILE OBJECT DEVICE

(71) Applicant: Panasonic Intellectual Property Management Co., Ltd., Osaka (JP)

(72) Inventors: Ryouichi Uemoto, Osaka (JP); Goro Tsuchiya, Osaka (JP); Masataka Akatsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

(21) Appl. No.: 16/303,674

(22) PCT Filed: Jun. 21, 2017

(86) PCT No.: PCT/JP2017/022777
§ 371 (c)(1),
(2) Date: Nov. 21, 2018

(87) PCT Pub. No.: WO2018/016254
PCT Pub. Date: Jan. 25, 2018

(65) Prior Publication Data
US 2019/0335259 A1    Oct. 31, 2019

(30) Foreign Application Priority Data

Jul. 22, 2016 (JP) ................. 2016-144797
Sep. 29, 2016 (JP) ................. 2016-192271
Sep. 29, 2016 (JP) ................. 2016-192312

(51) Int. Cl.
*H04R 1/02* (2006.01)
*B60R 11/02* (2006.01)
*H04R 9/04* (2006.01)

(52) U.S. Cl.
CPC .............. *H04R 1/025* (2013.01); *B60R 11/02* (2013.01); *H04R 9/045* (2013.01)

(58) Field of Classification Search
CPC .......... H04R 1/025; H04R 9/045; B60R 11/02
(Continued)

(56) References Cited

U.S. PATENT DOCUMENTS

2006/0237257 A1    10/2006 Sasaki et al.
2011/0013798 A1    1/2011 Niidera et al.
(Continued)

FOREIGN PATENT DOCUMENTS

JP    2006-229517 A    8/2006
JP    2008-042604 A    2/2008
(Continued)

OTHER PUBLICATIONS

International Search Report of PCT application No. PCT/JP2017/022777 dated Aug. 8, 2017.

*Primary Examiner* — Sean H Nguyen
(74) *Attorney, Agent, or Firm* — Greenblum & Bernstein, P.L.C.

(57) ABSTRACT

A loudspeaker unit includes a frame, a diaphragm having an inner periphery and an outer periphery, and a magnetic circuit coupled to the frame. The frame includes a first support part, a second support part, a pedestal part, and a plurality of reinforcement parts. The first support part supports the outer periphery of the diaphragm, and the second support part supports the magnetic circuit. The pedestal part spreads outward from the outer periphery of the first support part. The plurality of reinforcement parts are disposed side by side along the periphery of the pedestal part and fixed to the outer periphery of the first support part and the pedestal part. Each of the plurality of reinforcement parts includes a first portion having a first height relative to the pedestal part, (Continued)

and a second portion having a second height lower than the first height.

17 Claims, 18 Drawing Sheets

(58) Field of Classification Search
USPC .......................................................... 381/389
See application file for complete search history.

(56) References Cited

U.S. PATENT DOCUMENTS

2012/0140977 A1   6/2012  Hiramoto
2013/0323416 A1  12/2013  Bertelo et al.
2014/0093119 A1   4/2014  Kagawa et al.

FOREIGN PATENT DOCUMENTS

| JP | 2010-109830 A | 5/2010 |
|---|---|---|
| JP | 4937409 B | 5/2012 |
| JP | 2012-124579 A | 6/2012 |
| JP | 2013-543457 | 12/2013 |
| JP | 5822459 B | 11/2015 |
| JP | 2017-050702 A | 3/2017 |
| WO | 2013/161214 | 10/2013 |

SPEAKER UNIT, ELECTRONIC EQUIPMENT AND MOBILE OBJECT DEVICE

CROSS-REFERENCE TO RELATED APPLICATIONS

This application is a U.S. national stage application of the PCT International Application No. PCT/JP2017/022777 filed on Jun. 21, 2017, which claims the benefit of foreign priority of Japanese patent application No. 2016-144797, No. 2016-192312, and No. 2016-192271 filed on Jul. 22, 2016, Sep. 29, 2016 and Sep. 29, 2016, respectively, the contents all of which are incorporated herein by reference.

TECHNICAL FIELD

The present disclosure relates to a loudspeaker unit, an electronic device, and a movable-body apparatus.

BACKGROUND ART

Conventionally, a loudspeaker including a diaphragm, a frame which supports the diaphragm, and a reinforcement rib which reinforces the frame has been disclosed (refer to Patent Literature (PTL) 1).

CITATION LIST

Patent Literature

PTL 1: International Publication No. 2013/161214

SUMMARY OF THE INVENTION

In recent years, there has been a demand for further weight reduction of an in-vehicle loudspeaker unit in order to improve automobile energy consumption, and a lighter weight than the loudspeaker disclosed in PTL 1 is demanded.

Thus, the present disclosure provides a loudspeaker unit which can be sufficiently lightweight.

A loudspeaker unit according to one aspect of the present disclosure includes a frame, a diaphragm having an inner periphery and an outer periphery, and a magnetic circuit coupled to the frame. The frame includes a first support part, a second support part, a pedestal part and a plurality of reinforcement parts. The first support part supports the outer periphery of the diaphragm, and the second support part supports the magnetic circuit. The pedestal part spreads outward from an outer periphery of the first support part. Each of the plurality of reinforcement parts includes a first part and a second part. When the height of each of the plurality of reinforcement parts is defined relative to the pedestal part, the first part is greater in height than the second part.

The loudspeaker unit according to the present disclosure can be sufficiently lightweight while maintaining the shape and rigidity of the frame.

DESCRIPTION OF EMBODIMENTS

Loudspeaker units according to various exemplary embodiments of the present disclosure will be specifically described below with reference to the drawings.

Note that each of the exemplary embodiments described below shows a specific example of the present disclosure. The numerical values, shapes, materials, structural elements, the arrangement and connection of the structural elements etc. shown in the following exemplary embodiments are mere examples, and therefore do not limit the present disclosure. As such, among the structural elements in the following exemplary embodiments, structural elements not recited in any one of the independent claims which indicate the broadest concepts are described as arbitrary structural elements.

Note that in the following description, the direction in which the central axis of the loudspeaker unit extends is defined as a Z-axis direction, the direction opposite to the direction in which a connector part is located with respect to the central axis is defined as a Y-axis direction, and the direction orthogonal to the Z-axis direction and the Y-axis direction is defined as a X-axis direction. In FIGS. 1 to 19, sides pointed by arrows indicating the X axis, the Y axis, and the Z axis are referred to as the positive sides, and sides opposite thereto are referred to as the negative sides. Note that the central axis of the loudspeaker unit is the central axis of a substantially conical shape of the loudspeaker unit.

First Exemplary Embodiment

With reference to FIGS. 1 to 8, loudspeaker unit 100 according to a first exemplary embodiment will be described.

1-1. Configuration of Loudspeaker Unit

Figure 1:
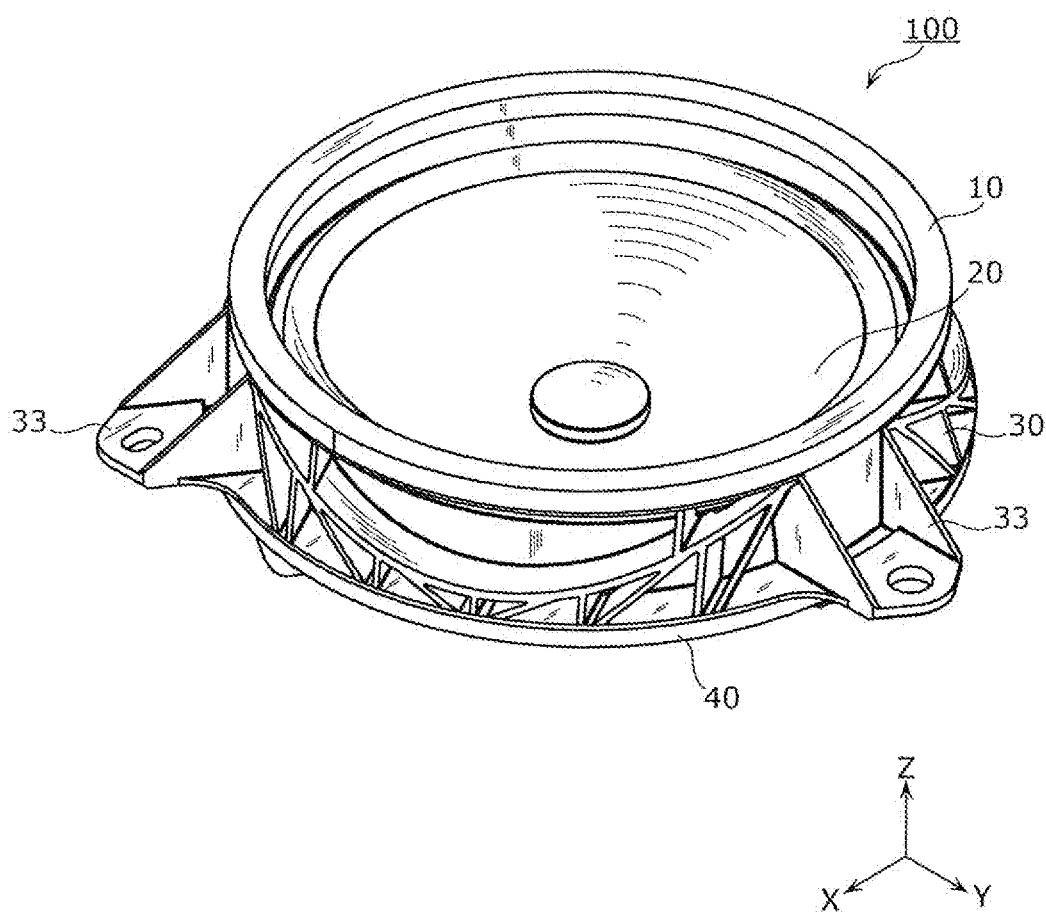
FIG. 1 is a perspective view illustrating one example of the external appearance of a loudspeaker unit according to a first exemplary embodiment of the present disclosure.
Figure 2:
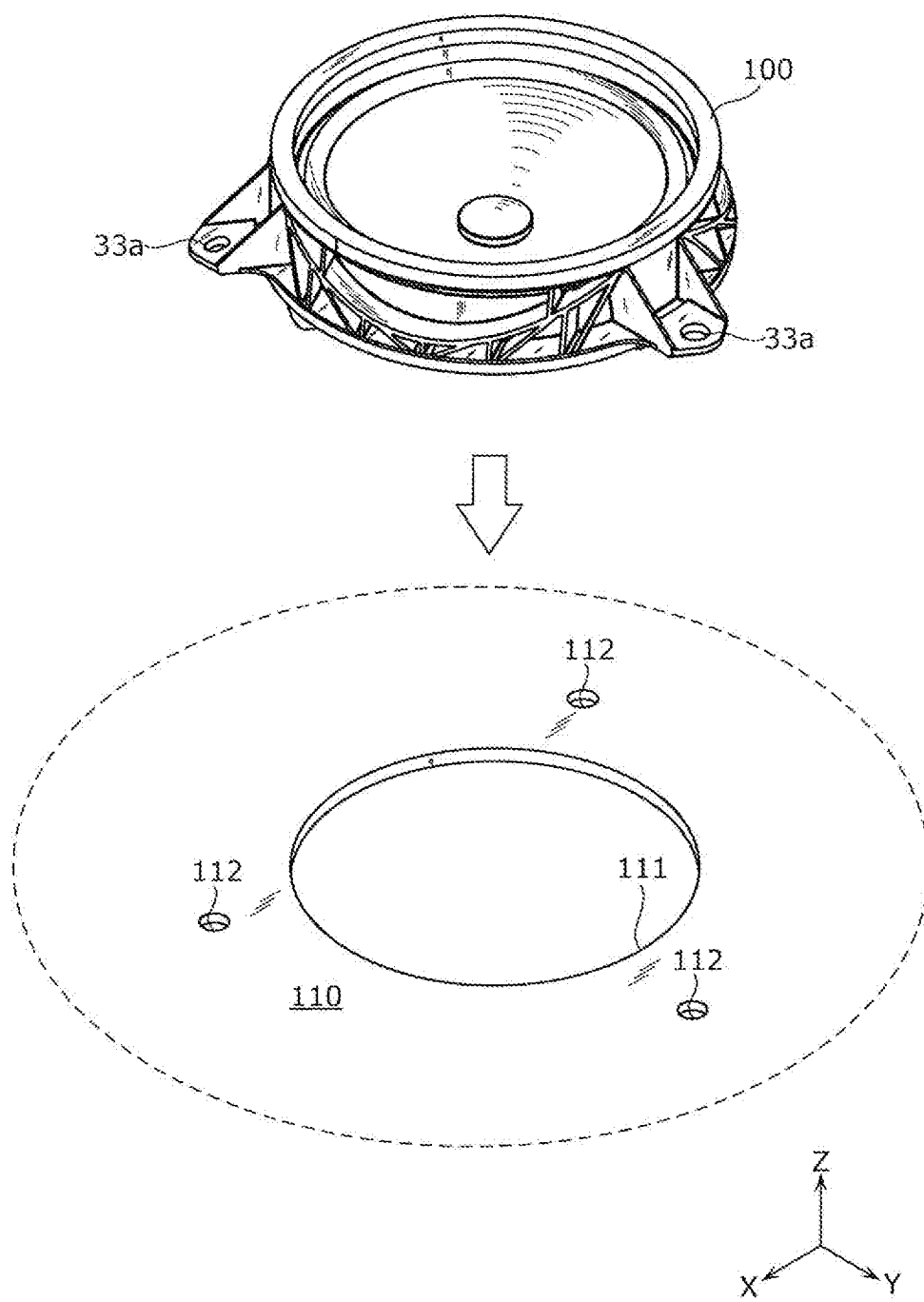
FIG. 2 illustrates an example in which the loudspeaker unit illustrated in FIG. 1 is fastened to an external casing.
Figure 3:
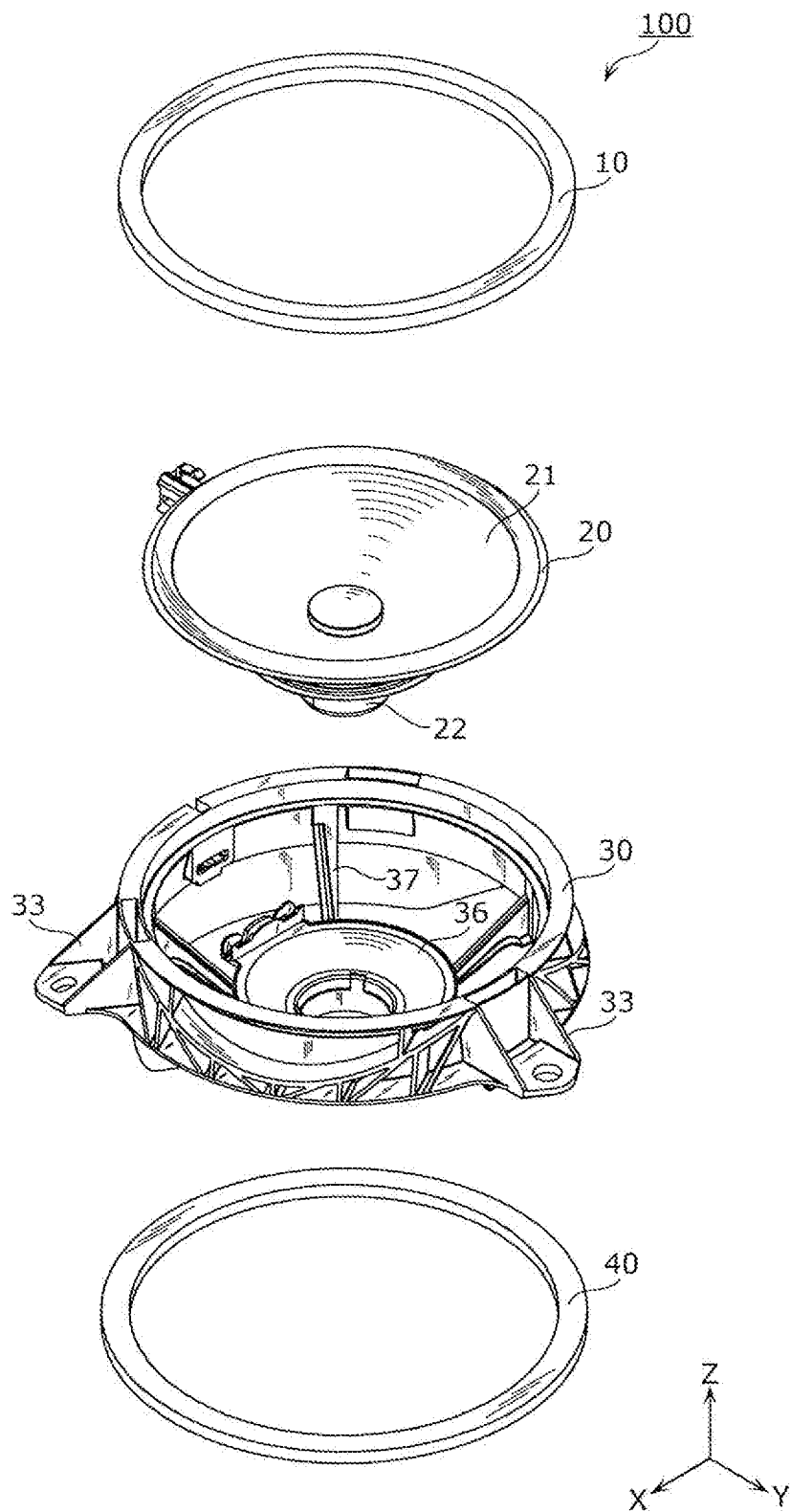
FIG. 3 is an exploded perspective view illustrating one example of the configuration of the loudspeaker unit illustrated in FIG. 1.

FIG. 1 is a perspective view illustrating one example of the external appearance of loudspeaker unit 100. FIG. 2 illustrates an example in which loudspeaker unit 100 is fastened to an external casing. FIG. 3 is an exploded perspective view illustrating one example of the configuration of loudspeaker unit 100.

Loudspeaker unit 100 includes first elastic member 10 and second elastic member 40. First elastic member 10 is disposed on frame 30 at a side on which loudspeaker unit 100 emits sound, and second elastic member 40 is disposed on frame 30 at a reverse side. These elastic members improve air-tightness and water-tightness and reduce rub and buzz that may occur due to vibration during operation of loudspeaker unit 100.

Loudspeaker unit 100 includes frame 30 to which diaphragm 21 having a substantially conical shape and magnetic circuit 22 having a substantially cylindrical shape are coupled. Magnetic circuit 22 includes a magnet, a plate, and a yoke (none of which is illustrated in the drawings), and when an audio signal is input to a voice coil, which is not illustrated in the drawings, the voice coil vibrates diaphragm 21 according to the audio signal. Magnetic circuit 22 may be of the inner magnet type or may be of the outer magnet type.

Frame 30 supports diaphragm 21. Furthermore, frame 30 includes a plurality of fastening parts 33. As illustrated in FIG. 2, external casing 110 such as a front door of an automobile generally has circular opening 111. The plurality of fastening parts 33 of frame 30 and external casing 110 are fastened together at a plurality of through-holes 112 of external casing 110 via fastening members not illustrated in the drawings. Thus, loudspeaker unit 100 is fixed to external casing 110 so that a part of loudspeaker unit 100 on the negative side in the Z axis is exposed in circular opening 111. Frame 30 is formed from resin, for example.

1-2. Configuration of Frame

Next, a detailed configuration of frame 30 will be described with reference to FIGS. 4 to 6.

Figure 4:
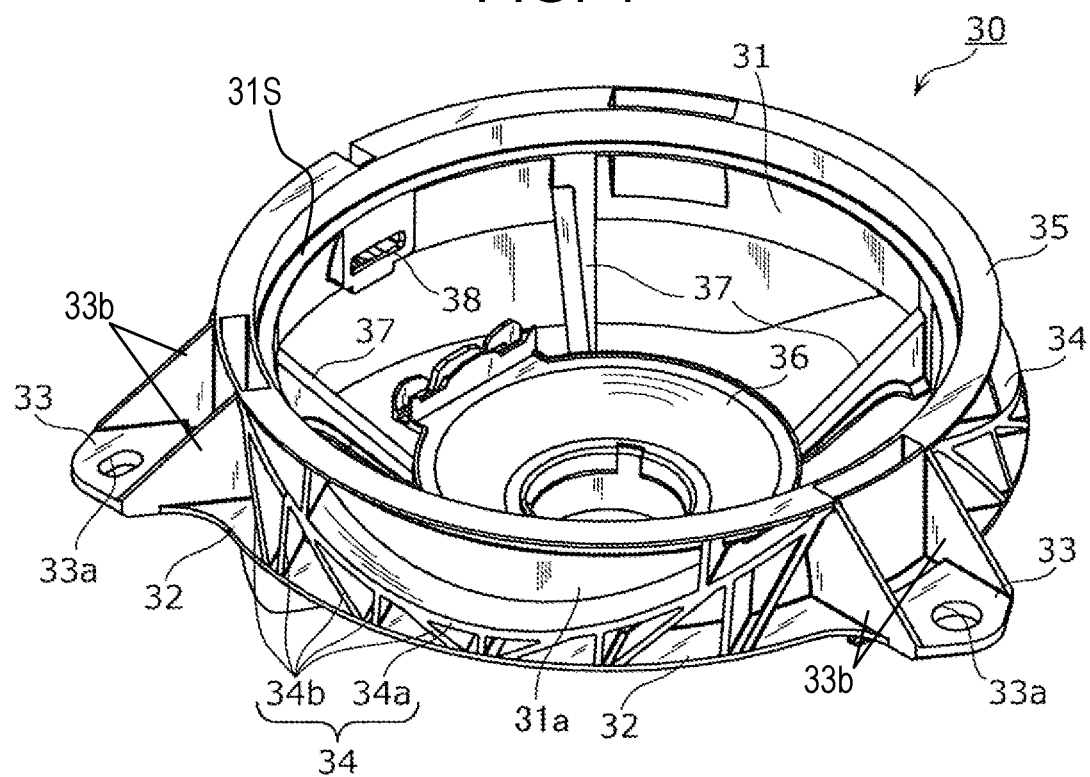
FIG. 4 is a perspective view of a frame of the loudspeaker unit illustrated in FIG. 3.

FIG. 4 is a perspective view of frame 30. FIG. 5 is a plan view of frame 30 as seen from the positive side of the Z axis. FIG. 6 is a perspective view of frame 30 as seen at a different angle than in FIG. 4.

Figure 5:
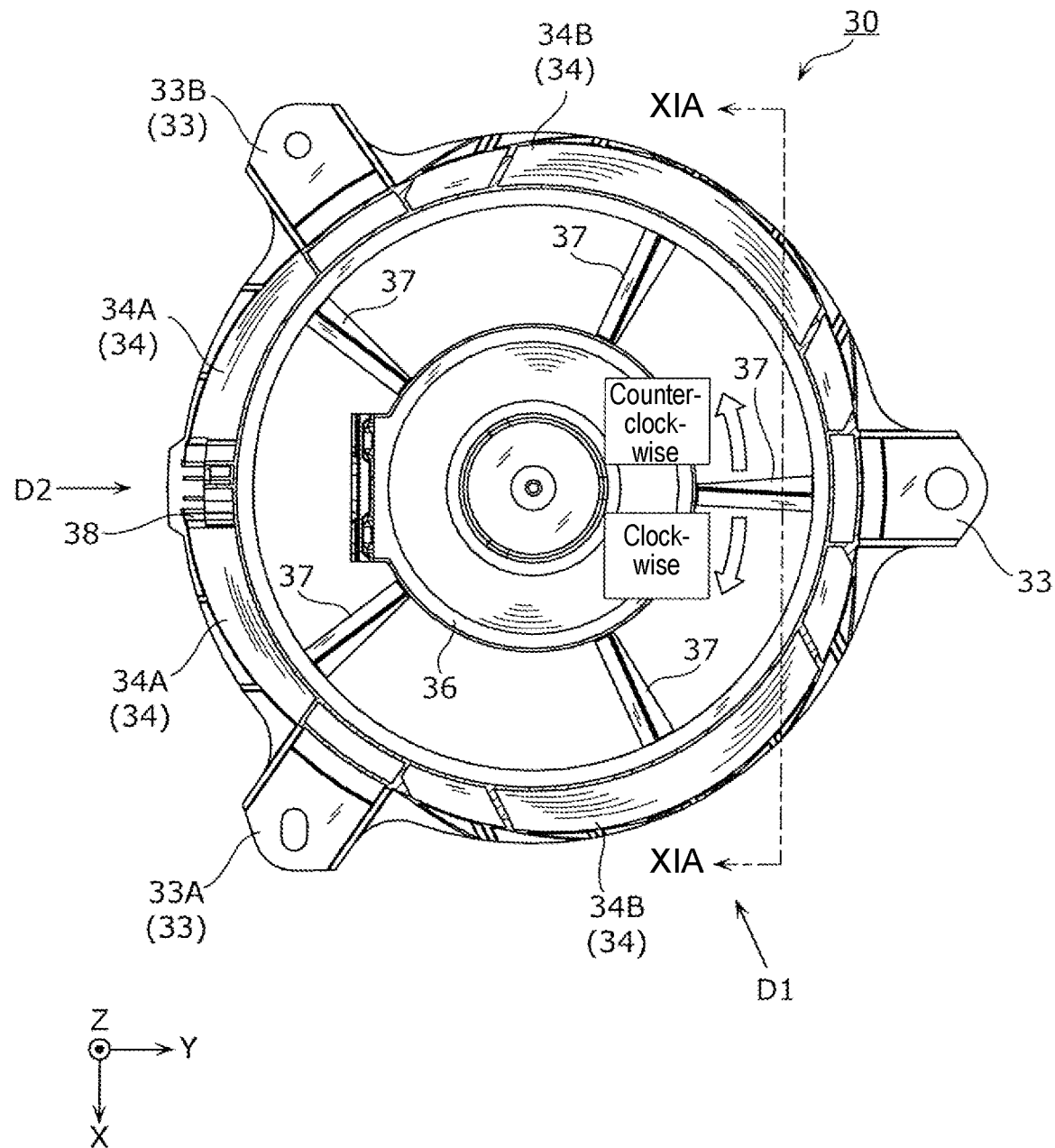
FIG. 5 is a plan view of the frame in FIG. 4 as seen from a positive side of the Z axis.
Figure 6:
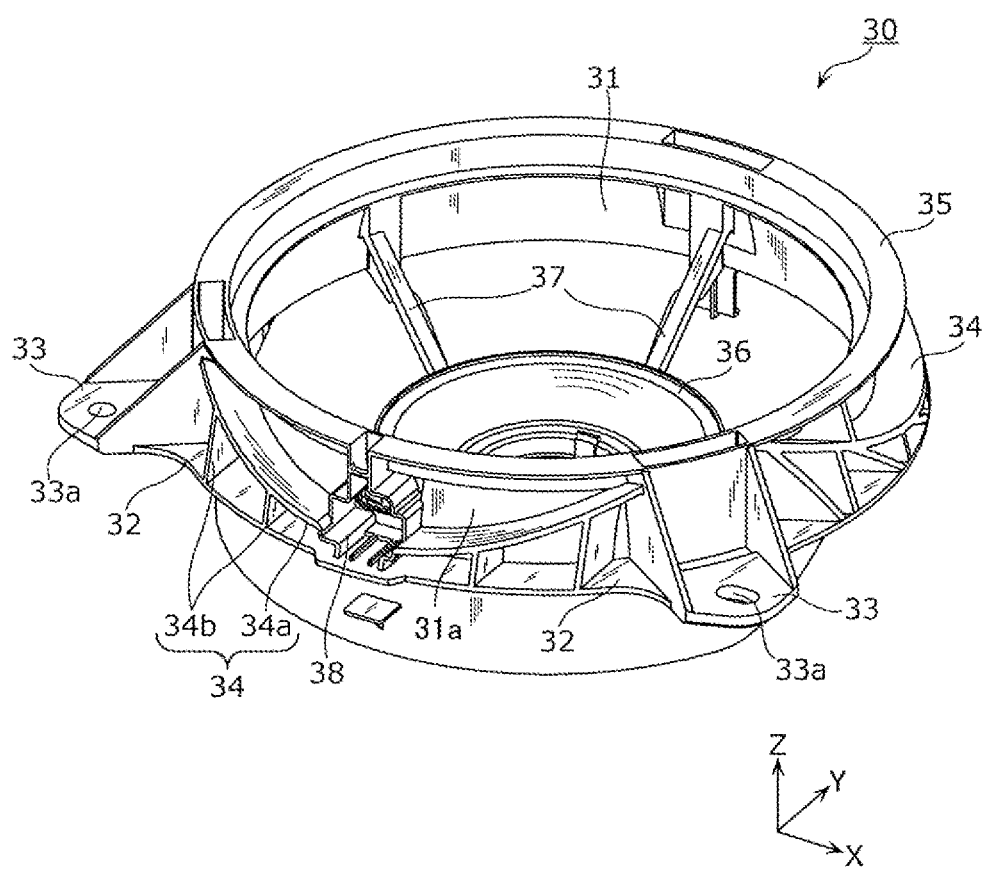
FIG. 6 is a perspective view of the frame as seen at a different angle than in FIG. 4.

As illustrated in FIGS. 4 to 6, frame 30 includes first support part 31 having a substantially tubular or cylindrical shape, pedestal part 32, a plurality of fastening parts 33, and a plurality of reinforcement parts 34. Frame 30 may further include second support part 36, a plurality of connection parts 37, and connector part 38. Note that in frame 30, these structural elements are integrally formed from resin.

First support part 31 has a substantially cylindrical shape and has support surface 31S which supports the outer periphery of diaphragm 21 disposed therein. First support part 31 has a shape corresponding to the outer periphery of diaphragm 21.

Second support part 36 supports a part of a damper, which is a vibration component of loudspeaker unit 100, and a portion of magnetic circuit 22. Specifically, second support part 36 includes a substantially conical portion and a substantially cylindrical bottomed portion. Second support part 36 is disposed inward of first support part 31. Second support part 36 covers the negative side, along the Z axis, of a negative-Z-axis portion of loudspeaker unit 100 and has a shape corresponding to the negative-Z-axis portion of loudspeaker unit 100.

As illustrated in FIG. 4, first support part 31 and second support part 36 are connected by the plurality of beam-shaped connection parts 37 so that second support part 36 is located inward of first support part 31.

Plate-shaped pedestal part 32 spreads outward from the outer periphery of first support part 31. Pedestal part 32 faces a portion of external casing 110 illustrated in FIG. 2 that surrounds opening 111 thereof. As a result of sandwiching second elastic member 40 between pedestal part 32 and the portion surrounding opening 111, the air-tightness and water-tightness between pedestal part 32 and a portion around opening 111 improve.

Note that as illustrated in FIG. 4, first support part 31 has, on the positive side of the Z axis, abutment surface 35 that is opposite to pedestal part 32. Abutment surface 35 abuts, via first elastic member 10, a portion of a casing (not illustrated in the drawings) that surrounds an opening thereof on the side on which sound is emitted from loudspeaker unit 100.

The plurality of (in the present exemplary embodiment, three) fastening parts 33 are disposed on pedestal part 32 at respective positions surrounding the outer periphery of first support part 31. Each of fastening parts 33 extends and protrudes outward (in a direction away from the central axis) from pedestal part 32. Fastening part 33 is thicker than pedestal part 32. Each of fastening parts 33 has through-hole 33a for allowing a predetermined fastening member to extend therethrough. Note that the predetermined fastening member is, for example, a screw, a bolt, or a rivet. Specifically, the predetermined fastening members fasten the plurality of fastening parts 33 and external casing 110 together by extending through through-holes 33a and 112, thereby loudspeaker unit 100 is fixed in a predetermined position on external casing 110 in such a way as to cover opening 111.

Furthermore, each of fastening parts 33 includes plate-shaped protrusions 33b protruding outward from the outer periphery of first support part 31. Specifically, fastening part 33 includes a pair of protrusions 33b. Protrusions 33b are formed at both ends of fastening part 33 along the outer periphery of first support part 31. Protrusions 33b are shaped substantially parallel to the Z-axis and the radial direction of the outer periphery of first support part 31. Protrusions 33b are continuously formed from the outer peripheral surface of first support part 31 to the positive-Z-axis surface of pedestal part 32. Thus, fastening parts 33 have increased strength so that deflection of fastening parts 33 with respect to pedestal part 32 can be reduced.

Furthermore, fastening parts 33 are disposed on frame 30 away from one another by 120 degrees around the point corresponding to the central axis of loudspeaker unit 100. In other words, fastening parts 33 are arranged equally spaced apart on the outer periphery of first support part 31.

Reinforcement parts 34 are disposed on pedestal part 32 in respective regions between adjacent two of fastening parts 33, and are fixed to the outer periphery of first support part 31 and pedestal part 32. Reinforcement parts 34 are fixed to a surface of pedestal part 32 on the reverse side from the surface thereof facing opening 111 (that is, the positive-Z-axis surface). In other words, pedestal part 32 has a surface opposite to support surface 31S along the axis of first support part 31, and reinforcement parts 34 are fixed to this surface.

Reinforcement part 34 includes curved plate part 34a, and a plurality of plate parts 34b each disposed between curved plate part 34a and pedestal part 32. In other words, in reinforcement part 34, plate parts 34b partitions the space between pedestal part 32 and curved plate part 34a. In this way, reinforcement part 34 includes spaces partitioned by plate parts 34b. In short, reinforcement part 34 has a hollow structure. Note that curved plate part 34a itself has a solid structure. Furthermore, each of plate parts 34b itself has a solid structure.

Curved plate part 34a is disposed facing pedestal part 32. Curved plate part 34a extends outward from the outer peripheral surface of first support part 31 and crosses the axis direction of first support part 31 (that is, the Z axis direction).

Plate parts 34b are arranged side by side along the outer periphery of first support part 31 and are fixed to first support part 31, pedestal part 32, and curved plate part 34a so as to cross first support part 31, pedestal part 32, and curved plate part 34a.

As illustrated in FIG. 5, fastening parts 33 include first fastening part 33A disposed on the positive side of the X axis, and second fastening part 33B disposed on the negative side of the X axis. Connector part 38 is disposed between first fastening part 33A and second fastening part 33B. A wire for inputting an audio signal to loudspeaker main body 20 is connected to connector part 38. Note that loudspeaker main body 20 includes diaphragm 21 and magnetic circuit 22.

Next, the shape of reinforcement parts 34 as seen from the side (orthogonally to the Z axis) will be described with reference to FIGS. 7 and 8.

Figure 7:
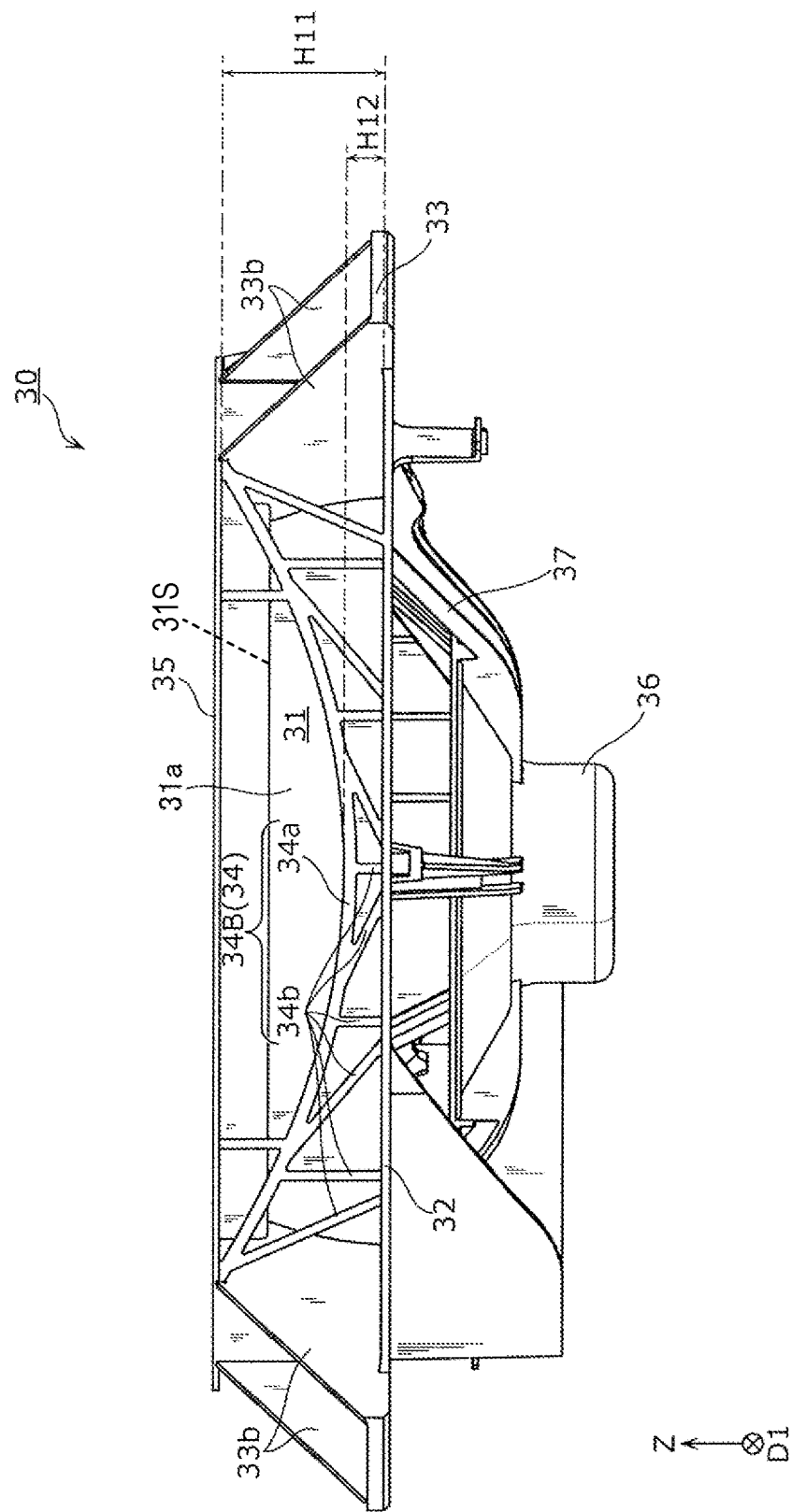
FIG. 7 is a side view of the frame as seen along a first visual line D1 in FIG. 5.

FIG. 7 is a side view of frame 30 as seen along the first visual line D1 in FIG. 5. FIG. 8 is a side view of frame 30 as seen along the second visual line D2 in FIG. 5.

Figure 8:
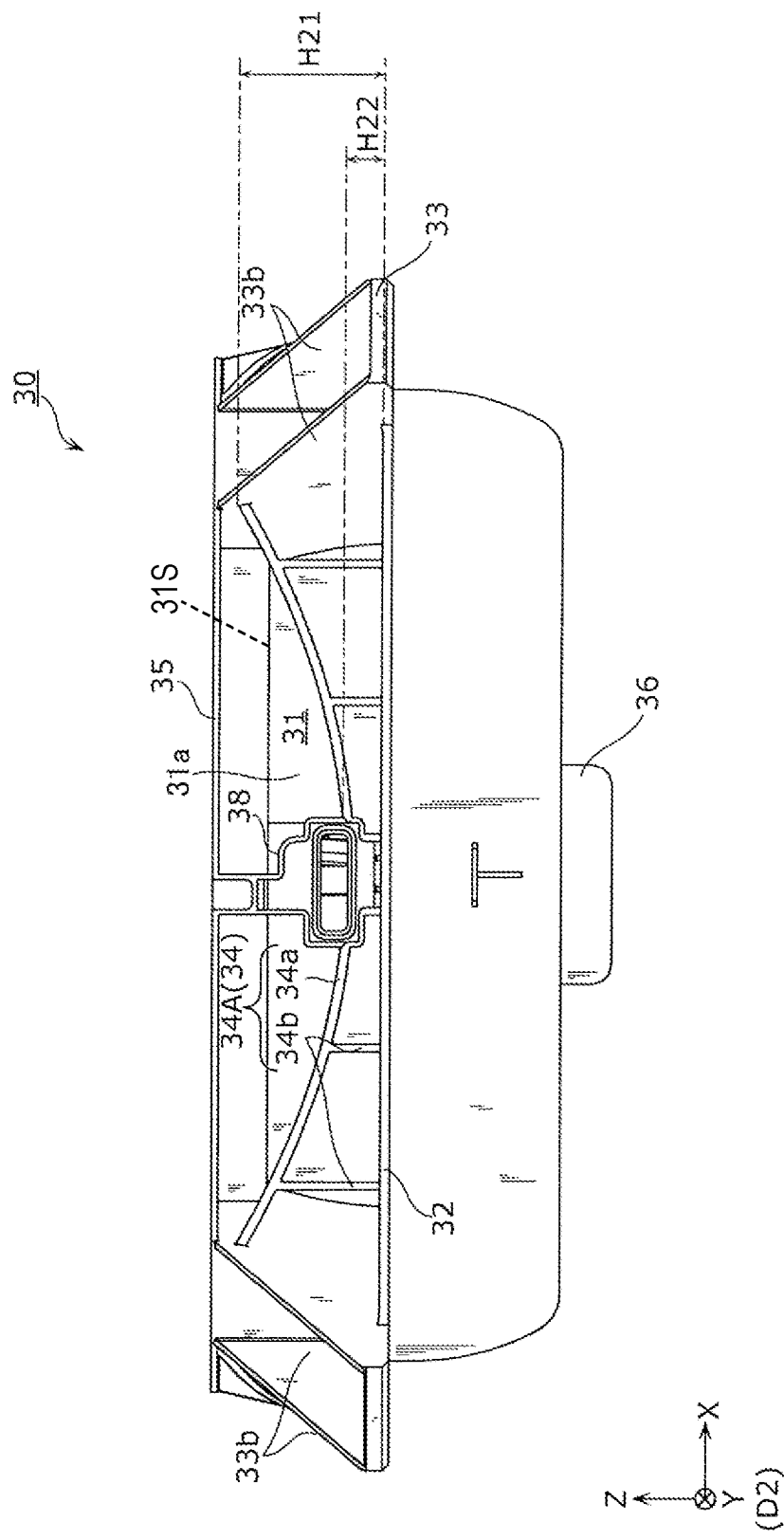
FIG. 8 is a side view of the frame as seen along a second visual line D2 in FIG. 5.

As illustrated in FIGS. 7 and 8, curved plate part 34a has a shape protruding from abutment surface 35 of first support part 31 toward pedestal part 32. In other words, curved plate part 34a has a shape protruding from support surface 31S of first support part 31 toward pedestal part 32. This means that curved plate part 34a has a curved shape protruding on the negative side of the Z axis. Thus, in the region between pedestal part 32 and support surface 31S, reinforcement part 34 has a curved shape protruding on the negative side of the Z axis as seen from the outside of first support part 31.

The both ends of reinforcement part 34 along the outer periphery of first support part 31 are fixed to protrusions 33b of two fastening parts 33 disposed on both sides of reinforcement part 34. As illustrated in FIG. 7, each of the first parts at the both ends of reinforcement part 34 has first height H11 where the height is defined with respect to pedestal part 32. On the other hand, the second part of reinforcement part 34 located in the middle between two fastening parts 33 has second height H12. Since curved plate part 34a has the shape protruding from abutment surface 35 of first support part 31 toward pedestal part 32 as described above, first height H11 is greater than second height H12. Likewise, height H21 of each of the first parts located at the both ends of reinforcement part 34 is greater than height H22 of the second part located in the middle, as illustrated in FIG. 8.

Furthermore, first height H11, H21 is substantially equal to the height of first support part 31 measured from pedestal part 32. Second height H12, H22 may be less than or equal to half of first height H11, H21. First height H11, H21 is the greatest height among the heights of the plurality of reinforcement parts 34 measured from pedestal part 32, and second height H12, H22 is the least height among the heights of the plurality of reinforcement parts 34 measured from pedestal part 32.

Furthermore, reinforcement part 34 may have a shape following a direction from the position of the approximate center of reinforcement part 34 toward the central axis of loudspeaker unit 100. In other words, curved plate part 34a and plate part 34b forming reinforcement part 34 may extend toward the central axis of loudspeaker unit 100 except for parts where fastening parts 33 are disposed along the outer periphery of first support part 31.

As illustrated in FIGS. 5, 7, and 8, among reinforcement parts 34A, first reinforcement part 34 on which connector part 38 is disposed, and second reinforcement part 34B different from first reinforcement part 34A, on which connector part 38 is not disposed, have different configurations. First reinforcement part 34A is disposed between first fastening part 33A and second fastening part 33B.

Specifically, plate parts 34b of first reinforcement part 34A are fewer in number than plate parts 34b of second reinforcement part 34B. First height H21 of first reinforcement part 34A is less than first height H11 of second reinforcement part 34B. Thus, the rigidity of first reinforcement part 34A is less than the rigidity of second reinforcement part 34B.

Connector part 38 is disposed on first reinforcement part 34A. Therefore, the rigidity of each reinforcement part is adjusted so that the total rigidity of first reinforcement part 34A and connector part 38 becomes equal to the rigidity of second reinforcement part 34B. In other words, the plurality of regions in pedestal part 32 that are located between fastening parts 33 have substantially equal rigidity.

Figure 9:
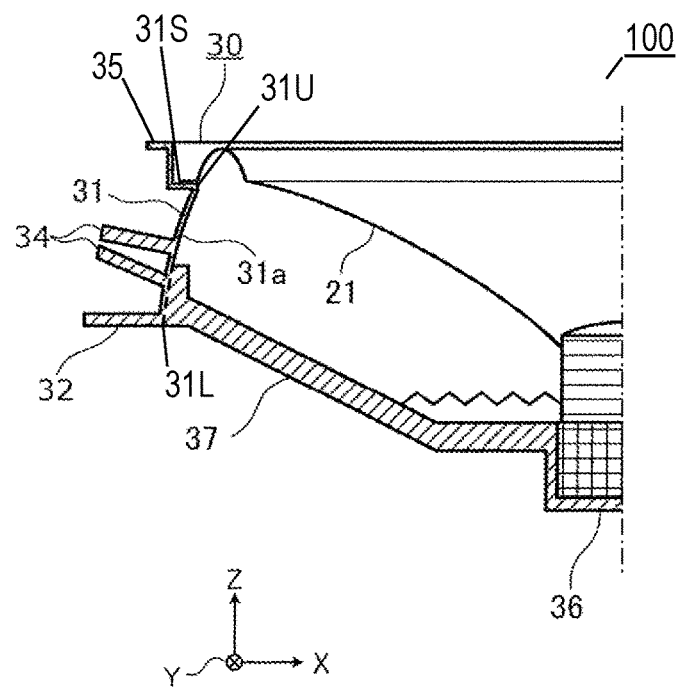
FIG. 9 is a schematic cross-sectional view of the frame illustrated in FIG. 4, taken along the XZ plane.

Next, with reference to FIG. 9, cylindrical first support part 31 will be described in more detail. FIG. 9 schematically illustrates a cross-section of frame 30 taken along the XZ plane.

First support part 31 supports the outer periphery of diaphragm 12 at first end opening 31U surrounded by support surface 31S and supports magnetic circuit 22 at second end opening 31L via connection part 37 and second support part 36. Furthermore, first support part 31 includes changing part 31a which monotonically changes the opening area in a plane perpendicular to an axis (the Z axis in the drawings) extending from first end opening 31U toward second end opening 31L. Since changing part 31a has a substantially uniform thickness, the inner peripheral surface and the outer peripheral surface of changing part 31a are inclined at substantially the same angle with respect to the horizontal plane.

The opening area indicates the area of a region surrounded by first support part 31, in a cross-section of first support part 31 virtually cut along the plane perpendicular to the axis (Z axis) extending from first end opening 31U toward second end opening 31L of first support part 31. In the structure illustrated in FIG. 9, the whole of first support part 31 is changing part 31a.

As described above, first support part 31 has a shape corresponding to the outer periphery of diaphragm 21, and with the structure illustrated in FIG. 9, diaphragm 21 has a conical shape. Thus, first support part 31 has a substantially cylindrical shape. Accordingly, changing part 31a also has a substantially cylindrical shape (ring shape).

In changing part 31a, the opening area monotonically increases from first end opening 31U toward second end opening 31L (toward the negative side of the Z axis in the drawings). Furthermore, the opening area monotonically increases in such a way that the shape of changing part 31a bulges outward. More specifically, changing part 31a is curved from first end opening 31U toward second end opening 31L at a predetermined rate of curvature. In other words, changing part 31a is curved in the shape of an arc that is a portion of a perfect circle.

Note that the configuration of first support part 31 including changing part 31a may be applied to a second exemplary embodiment to be described later.

Next, a detailed configuration of each of connection parts 37 will be described with reference to FIGS. 10, 11A, and 11B.

Connection parts 37 have the same shape; thus, connection part 37 disposed along the Y axis will be described here while description of other connection parts 37 will be omitted.

Figure 10:
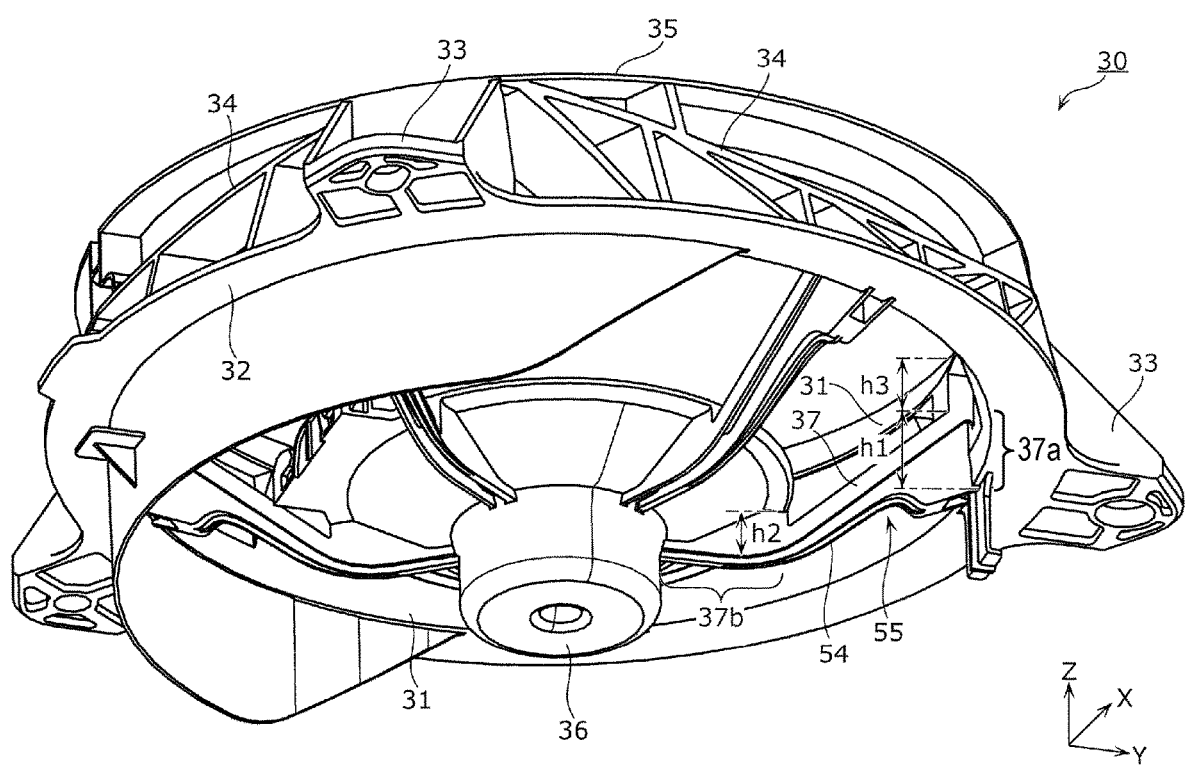
FIG. 10 is a perspective view of the frame shown in FIG. 4 as seen from below.
Figure 11A:
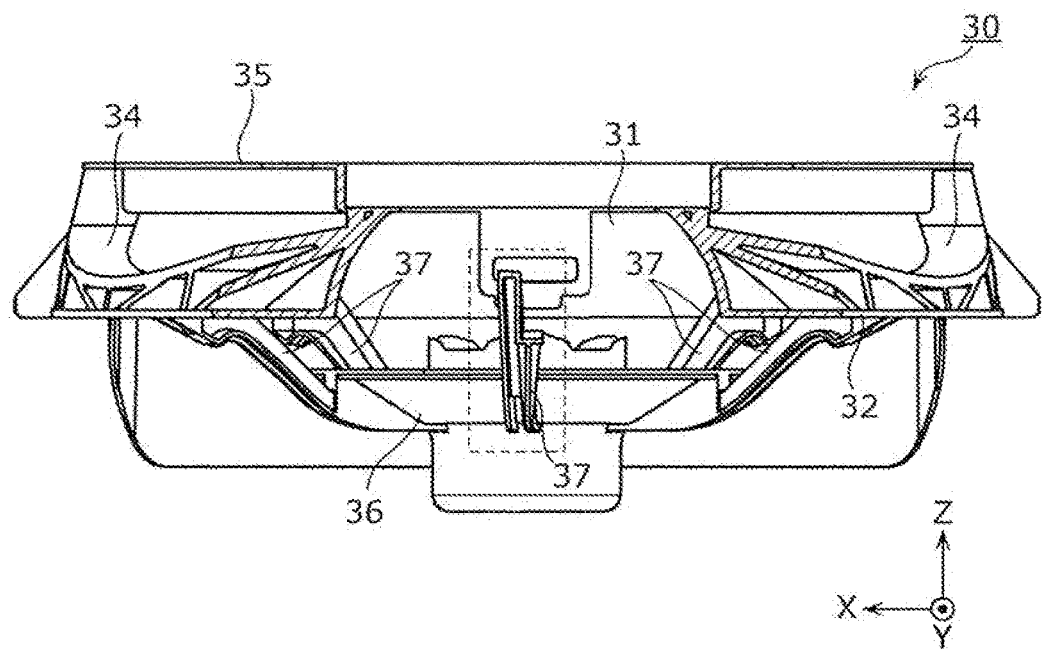
FIG. 11A is a cross-sectional view taken along line XIA-XIA of FIG. 5.

FIG. 10 is a perspective view of frame 30 as seen from below. FIG. 11A is a cross-sectional view taken along line XIA-XIA of FIG. 5. FIG. 11B is an enlarged view of the part indicated by the dashed lines in FIG. 11A, in the proximity of connection part 37 in FIG. 11A.

As illustrated in FIG. 10, the width of connection part 37 in a sound emitting direction (Z axis direction or the first direction) increases from second support part 36 toward first support part 31. Specifically, the length of connection part 37 in the first direction parallel to the central axis of first support part 31 increases with proximity (nearness) to first support part 31 relative to second support part 36. Connection part 37 includes first connection portion 37a connected to first support part 31, and second connection portion 37b connected to second support part 36. The width (length) of first connection portion 37a and the width (length) of second connection portion 37b along the Z axis are first width h1 and second width h2, respectively. First with h1 is greater than second width h2. The distance between first connection portion 37a and the end of first support part 31 on the positive side of the Z axis (that is, abutment surface 35) is width h3. Thus, there is a gap having width h3 between first connection portion 37a and abutment surface 35. The end on the positive side of the Z axis (abutment surface 35) is the first end of first support part 31, and the end of first support part 31 on the negative side of the Z axis is the second end of first support part 31 which is closer to second support part 36 than the first end is.

Connection part 37 is formed along the radius of diaphragm 21. Accordingly, connection parts 37 are radially formed from second support part 36 toward first support part 31.

Figure 11B:
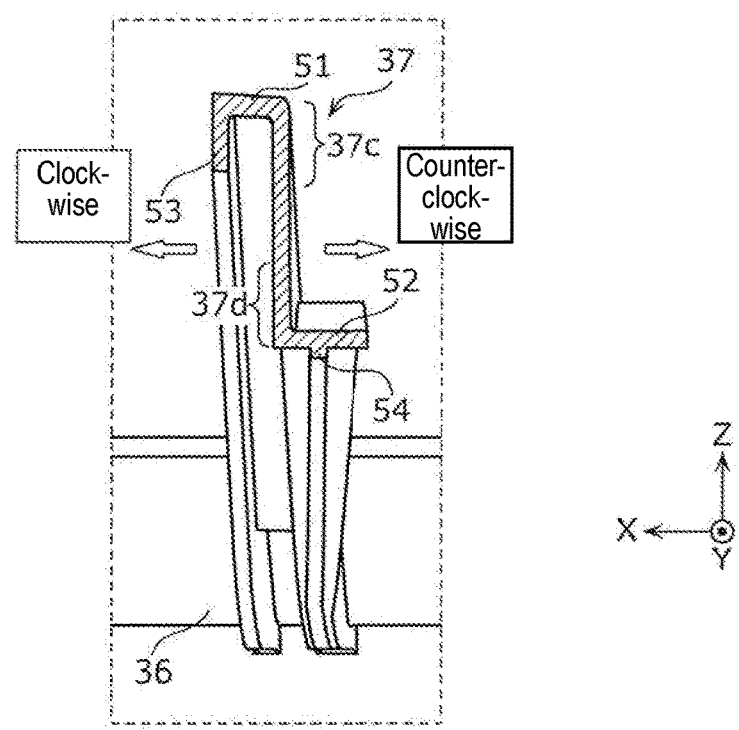
FIG. 11B is an enlarged view of the part indicated by the dashed lines in FIG. 11A.

Furthermore, as illustrated in FIG. 11B, connection part 37 may include first portion 37c, second portion 37d, first rib 51, and second rib 52. First portion 37c is located at the front of connection part 37 (on the positive side of the Z axis) and extends along the radius of diaphragm 21. Second portion 37d is located rearward of first portion 37c (on the negative side of the Z axis). In other words, second portion 37d is closer to pedestal part 32 than first portion 37c is in the aforementioned first direction. First rib 51 is erected from first portion 37c toward one side of the periphery of diaphragm 21 (along the direction of rightward rotation or the clockwise direction in a top view) and extends along the radius. In other words, first rib 51 is erected from first portion 37c in the first rotation direction along the outer periphery of diaphragm 21 and extends along the radius of diaphragm 21. Second rib 52 is erected from second portion 37d toward the other side of the periphery (along the direction of leftward rotation or the counterclockwise direction in the top view) and extends along the radius. In other words, second rib 52 is erected from second portion 37d in the second rotation direction opposite to the first rotation direction and extends along the radius of diaphragm 21. In this way, first rib 51 and second rib 52 are formed in connection part 37, and show an approximate Z-shape cross-section.

Connection part 37 may further include third rib 53. Third rib 53 is erected from first rib 51 toward the backside (the negative side of the Z axis) and extends along the radius. In other words, third rib 53 is erected from first rib 51 toward pedestal part 32 along the aforementioned first direction and extends along the radius of diaphragm 21.

Connection part 37 may further include fourth rib 54. Fourth rib 54 is erected from second rib 52 toward the backside (the negative side of the Z axis) and extends along the radius. In other words, fourth rib 54 is erected from second rib 52 toward pedestal part 32 along the aforementioned first direction and extends along the radius of diaphragm 21.

In this way, connection part 37 may include first rib 51, second rib 52, third rib 53, and fourth rib 54. Ribs 51 to 54 may be formed across the whole length of connection part 37.

Furthermore, regarding connection part 37, as illustrated in FIG. 10, an end of first connection portion 37a in a direction in which connection part 37 extends (the outer side in the radial direction of diaphragm 21) is connected to the inner periphery of first support part 31. In addition, connection part 37 includes ribs 51 to 54 formed across the whole length of connection part 37. Thus, first rib 51 and second rib 52 may be connected to first support part 31. Third rib 53 and fourth rib 54 may be connected to first support part 31. Note that connection part 37 is connected to first support part 31 by being fixed to first support part 31.

Furthermore, regarding connection part 37, an upper portion of connection part 37 is connected to the outer lower surface of second support part 36 at second connection portion 37b. In other words, connection part 37 may have a shape such that first rib 51 and second rib 52 extend at second connection portion 37b. Furthermore, connection part 37 may have a shape such that third rib 53 and fourth rib 54 extend at second connection portion 37b. As described above, second connection portion 37b of connection part 37 is connected to second support part 36, in an outer lower area thereof. This means that a portion protruding from the outer lower area of second support part 36 on the negative side of the Z axis is second connection portion 37b, and ribs 51 to 54 may be formed extending to second connection portion 37b.

Furthermore, as illustrated in FIG. 10, connection part 37 may include recess 55 recessed from the negative side of the Z axis to the positive side of the Z axis.

Note that the configuration of connection part 37 may be applied to the second exemplary embodiment to be described later.

1-3. Advantageous Effects, Etc.

Loudspeaker unit 100 according to the present exemplary embodiment is fixed to opening 111 in a state it covers opening 111. Loudspeaker unit 100 includes diaphragm 21, magnetic circuit 22, and frame 30 coupled to diaphragm 21 and magnetic circuit 22. Frame 30 includes first support part 31, second support part 36, pedestal part 32, and reinforcement parts 34. First support part 31 supports the outer periphery of diaphragm 21 disposed therein. Second support part 36 supports magnetic circuit 22. Pedestal part 32 spreads outward from the outer periphery of first support part 31 and faces opening 111. Reinforcement parts 34 are arranged side by side along the periphery of pedestal part 32 and are fixed to the outer periphery of first support part 31 and a surface of pedestal part 32 on the reverse side from the surface thereof facing opening 111. Each of reinforcement parts 34 has a hollow structure. Each of reinforcement parts 34 includes a first portion having first heights H11, H21 as heights measured from pedestal part 32, and a second portion having second heights H12, H22 as heights measured from pedestal part 32. Second height H12 is less than first height H11, and second height H22 is less than first height H21.

Thus, in reinforcement part 34, the second portion is lower in height than the first portion; accordingly, the weight of frame 30 can be lighter by as much as the portion reduced in height. Thus, frame 30 can be sufficiently lightweight, and loudspeaker unit 100 can be sufficiently lightweight.

Each of reinforcement parts 34 may include plate parts 34b. In this case, each of plate parts 34b is fixed to first support part 31 and pedestal part 32 so as to cross first support part 31 and pedestal part 32. Reinforcement parts 34 are arranged side by side along the outer periphery of first support part 31.

With this configuration, reinforcement parts 34 have sufficient strength. Thus, frame 30 can be sufficiently lightweight while having sufficient strength.

Each of reinforcement parts 34 may further include curved plate part 34a disposed facing pedestal part 32. In this case, each of plate parts 34b is disposed between pedestal part 32 and curved plate part 34a and is fixed to curved plate part 34a to cross curved plate part 34a.

In this way, each of reinforcement parts 34 has a hollow structure formed by curved plate part 34a and plate parts 34b. Thus, frame 30 has sufficient strength at pedestal part 32.

Each of reinforcement parts 34 may be formed along a direction from the position of the approximate center of reinforcement part 34 toward the central axis of loudspeaker unit 100.

Thus, for example, a die shaped substantially parallel to the direction from the position of the approximate center of reinforcement part 34 toward the central axis of loudspeaker main body 20 may be used to form frame 30 by resin molding. Consequently, frame 30 can be easily formed.

Frame 30 may further include fastening parts 33. In this case, fastening parts 33 are disposed on respective positions on pedestal part 32 that surround the outer periphery of first support part 31 and are fastened around opening 111. Reinforcement parts 34 are disposed on respective regions of pedestal part 32. Each of the regions is located between adjacent two of fastening parts 33.

Loudspeaker unit 100 can be easily mounted to external casing 110 due to frame 30 including fastening parts 33. Reinforcement parts 34 can be provided in such a way as not to interfere with fastening parts 33.

Frame 30 may further include connector part 38 to which a wire for inputting an audio signal to loudspeaker main body 20 is connected. In this case, fastening parts 33 include first fastening part 33A and second fastening part 33B, and connector part 38 is disposed between first fastening part 33A and second fastening part 33B. Reinforcement parts 34 include first reinforcement part 34A disposed between first fastening part 33A and second fastening part 33B, and second reinforcement part 34B different from first reinforcement part 34A. The rigidity of first reinforcement part 34A is lower than the rigidity of second reinforcement part 34B.

The region, of pedestal part 32, where connector part 38 is disposed has higher rigidity by as much as that of the portion where connector part 38 is formed. Therefore, the rigidity of first reinforcement part 34A is set lower than the rigidity of second reinforcement part 34B, allowing uniform rigidity of the plurality of regions on pedestal part 32. As a result, it is possible to reduce the occurrence of a specific portion of pedestal part 32 being deformed or damaged due to a load placed on this specific portion alone.

Plate parts 34b of first reinforcement part 34A may be fewer in number than plate parts 34b of second reinforcement part 34B. This configuration allows the rigidity of first reinforcement part 34A to be set lower than the rigidity of second reinforcement part 34B with a simple configuration.

Each of the plurality of reinforcement parts 34 may have a curved shape protruding toward pedestal part 32, as seen from the outside of first support part 31, on the reverse side from where pedestal part 32 is located. In other words, each of reinforcement parts 34 may include, in a region between support surface 31S of first support part 31 and pedestal part 32, curved plate part 34a having a shape protruding from support surface 31S of first support part 31 toward pedestal part 32, as seen from the outside of first support part 31. With this configuration, reinforcement parts 34 have improved rigidity.

Furthermore, each of fastening parts 33 may include plate-shaped protrusion 33b protruding outward from the outer periphery of first support part 31. In this case, the both ends of each reinforcement part 34 along the outer periphery of first support part 31 are fixed to protrusions 33b of adjacent two of fastening parts 33. Heights H11, H21 at the both ends of reinforcement part 34, measured from pedestal part 32, are greater than heights H12, H22 of a portion of reinforcement part 34 located between the adjacent two of fastening parts 33, measured from pedestal part 32. In short, the height of reinforcement part 34 relative to pedestal part 32 is the greatest at the both ends of reinforcement part 34.

Generally, second elastic member 40 serving as a gasket is disposed between pedestal part 32 and a portion surrounding opening 111 in order to improve air-tightness and water-tightness. Furthermore, loudspeaker unit 100 is fastened to external casing 110 at fastening parts 33 using fastening members in such a way that compressive stress is applied to second elastic member 40 in the state where second elastic member 40 is disposed between pedestal part 32 and the portion surrounding opening 111. Accordingly, pedestal part 32 is placed under the force of repulsion from second elastic member 40. In particular, the region, of pedestal part 32, which is located between the adjacent two of fastening parts 33 is not fastened by the fastening member and is therefore easily deformed into a shape protruding away from opening 111. Regarding this, in the easily deformable region, of pedestal part 32, which is located between the adjacent two of fastening parts 33, the height of reinforcement part 34 measured from pedestal part 32 at the both ends of reinforcement part 34 is greater than the height of the portion of reinforcement part 34 that is located between fastening parts 33. Therefore, it is possible to suppress the portion of pedestal part 32 that is located between the adjacent two of fastening parts 33 from being deformed into a shape protruding away from opening 111. In this way, deformation of pedestal part 32 can be suppressed; therefore, gap between pedestal part 32 and the portion surrounding opening 111 can be suppressed from generating. Thus, the air-tightness and water-tightness between loudspeaker unit 100 and the portion around opening 111 can be improved.

Heights H11 (H21) of the both ends of each of reinforcement parts 34, measured from pedestal part 32, are substantially equal. Heights H12, H22 of the approximate middles of respective reinforcement parts 34 along the outer periphery of first support part 31, measured from pedestal part 32, are the lowest of the height of each of reinforcement parts 34 measured from pedestal part 32. This means that the height of reinforcement part 34 measured from pedestal part 32 is, around the middle along the outer periphery of first support part 31, the lowest height of reinforcement part 34.

Therefore, it is possible to effectively suppress pedestal part 32 from being deformed into a shape protruding away from opening 111. Thus, the air-tightness and water-tightness between loudspeaker unit 100 and the portion around opening 111 can be improved.

Furthermore, in loudspeaker unit 100, first support part 31, which is a main structural element of frame 30, is changing part 31a having an approximate tapered shape. Therefore, it is possible to suppress distortion of frame 30 that occurs when frame 30 is mounted to external casing 110. Accordingly, diaphragm 21 mounted on first end opening 31U of first support part 31 can be evenly held, and thus undistorted sound can be reproduced. In addition, since the thickness of first support part 31 is set constant, loudspeaker unit 100 can be lightweight.

Furthermore, the opening area of first support part 31 changes in such a way that the opening area increases toward second end opening 31L from first end opening 31U to which diaphragm 21 is mounted. Thus, first end opening 31U, which requires high rigidity and is concentrically loaded, can be made small, resulting in loudspeaker unit 100 being lightweight.

Furthermore, changing part 31a is curved in such a way as to bulge outward, and thus frame 30 has improved buckling strength, leading to suppressed acoustic resistance.

Each of connection parts 37 connects first support part 31 and second support part 36. The width of connection part 37 in the first direction parallel to the central axis of first support part 31 increases with proximity to first support part 31 relative to second support part 36. First width h1 of first connection portion 37a, which is connected to first support part 31, along the Z axis is greater than second width h2 of second connection portion 37b, which is connected to second support part 36, along the Z axis.

With this configuration, it is possible to reduce weight while maintaining strength at first connection portion 37a.

A gap is provided between first connection portion 37a and the end of first support part 31 on the positive side of the Z axis. Thus, frame 30 can be more lightweight.

Connection part 37 is formed along the radius of diaphragm 21 and includes first rib 51 and second rib 52. Thus, the strength of connection part 37 can be further improved.

Connection part 37 further includes third rib 53. Thus, the strength of connection part 37 can be further improved.

Connection part 37 further includes fourth rib 54. Thus, the strength of connection part 37 can be further improved.

Furthermore, connection part 37 has a shape such that first rib 51 and second rib 52 extend at second connection portion 37b. Thus, the strength of second connection portion 37b can be further improved.

First rib 51 and second rib 52 are connected to first support part 31. Thus, the strength of first connection portion 37a can be further improved.

When the surface of connection part 37 on the negative side of the Z axis is recessed toward the positive side of the Z axis, frame 30 can be more lightweight while maintaining strength at connection part 37.

Second Exemplary Embodiment 2-1. Configuration of Frame

Next, with reference to FIGS. 12 to 14, a loudspeaker unit according to the second exemplary embodiment will be described.

Figure 12:
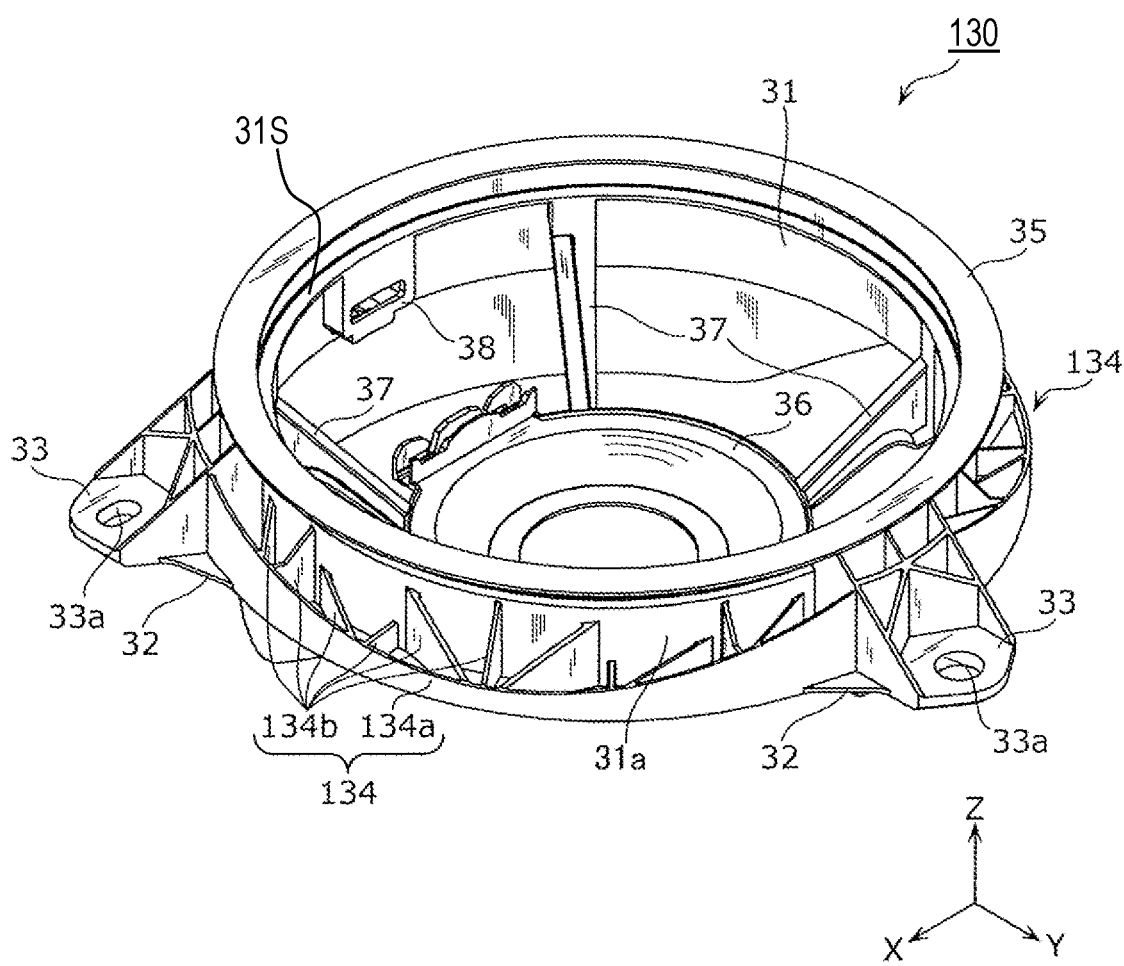
FIG. 12 is a perspective view of a frame of a loudspeaker unit according to a second exemplary embodiment of the present disclosure.

FIG. 12 is a perspective view of frame 130 according to the present exemplary embodiment. FIG. 13 is a plan view of frame 130 as seen from the positive side of the Z axis. FIG. 14 is a perspective view of frame 130 as seen at a different angle than in FIG. 12. Frame 130 includes a plurality of reinforcement parts 134.

A loudspeaker unit according to the present exemplary embodiment includes frame 130 instead of frame 30 in loudspeaker unit 100 according to the first exemplary embodiment. Specifically, the loudspeaker unit according to the present exemplary embodiment is substantially the same as loudspeaker unit 100 except for frame 130. Therefore, only the configuration of frame 130 will be described. The main difference in configuration between frame 130 and frame 30 according to the first exemplary embodiment is the configuration of reinforcement parts 134; thus, the following description will be focused on the configuration of reinforcement parts 134. Note that in the following description, elements common with those in the first exemplary embodiment share the same reference marks as in the first exemplary embodiment. The structural elements of frame 130, namely, first support part 31, pedestal part 32, fastening parts 33, reinforcement parts 134, second support part 36, connection parts 37, and connector part 38, are integrally formed from resin.

Similar to reinforcement parts 34 of frame 30 according to the first exemplary embodiment, reinforcement parts 134 are disposed on respective regions of pedestal part 32, where the regions are located between adjacent two of fastening parts 33, and are fixed to the outer periphery of first support part 31 and pedestal part 32. Reinforcement parts 134 are fixed to a surface of pedestal part 32 on the opposite side from the surface thereof facing opening 111 (that is, the positive-Z-axis surface). In other words, pedestal part 32 has a surface opposite to support surface 31S along the axis of first support part 31, and reinforcement parts 134 are fixed to this surface.

Figure 13:
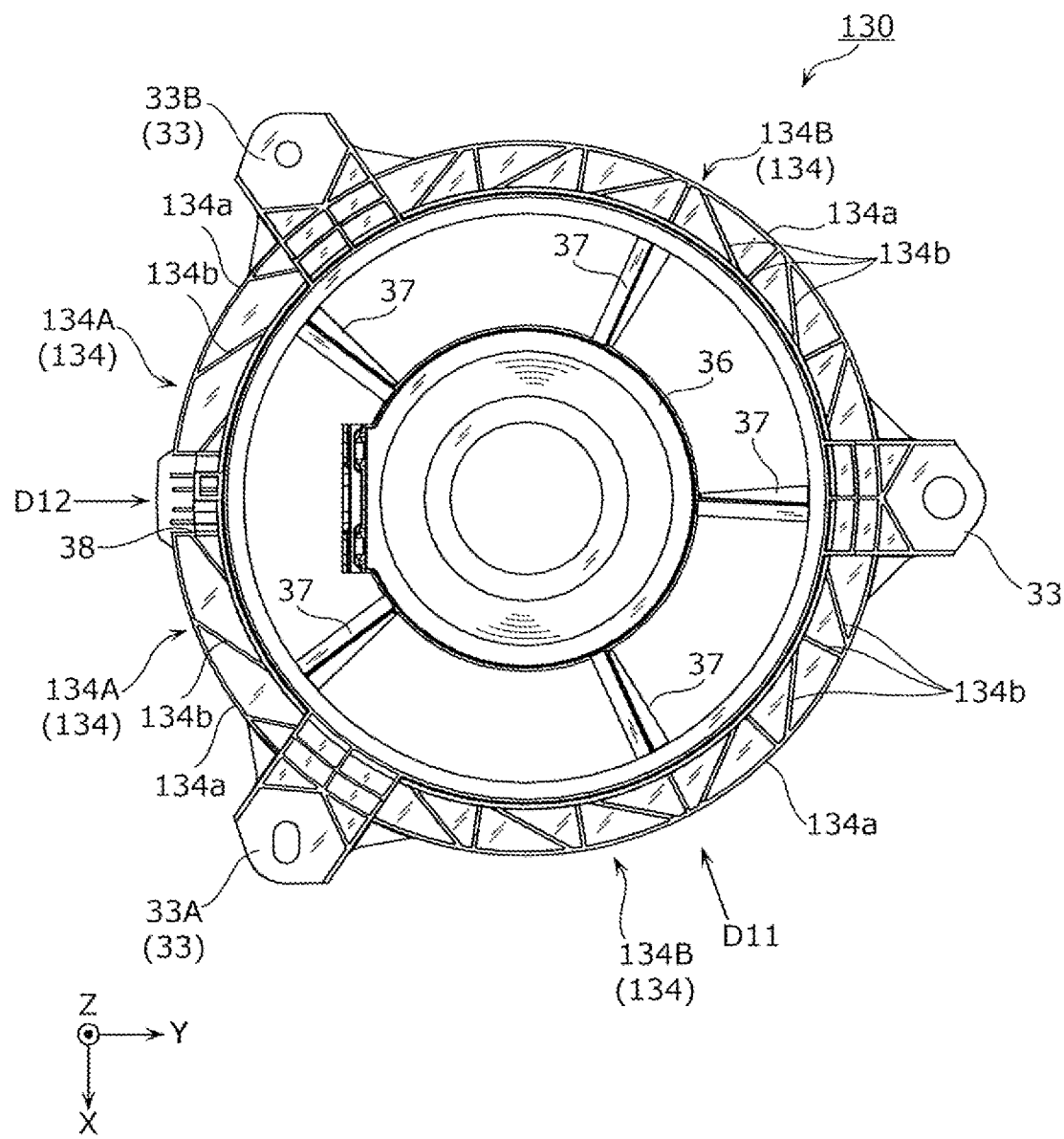
FIG. 13 is a plan view of the frame in FIG. 12 as seen from the positive side of the Z axis.
Figure 14:
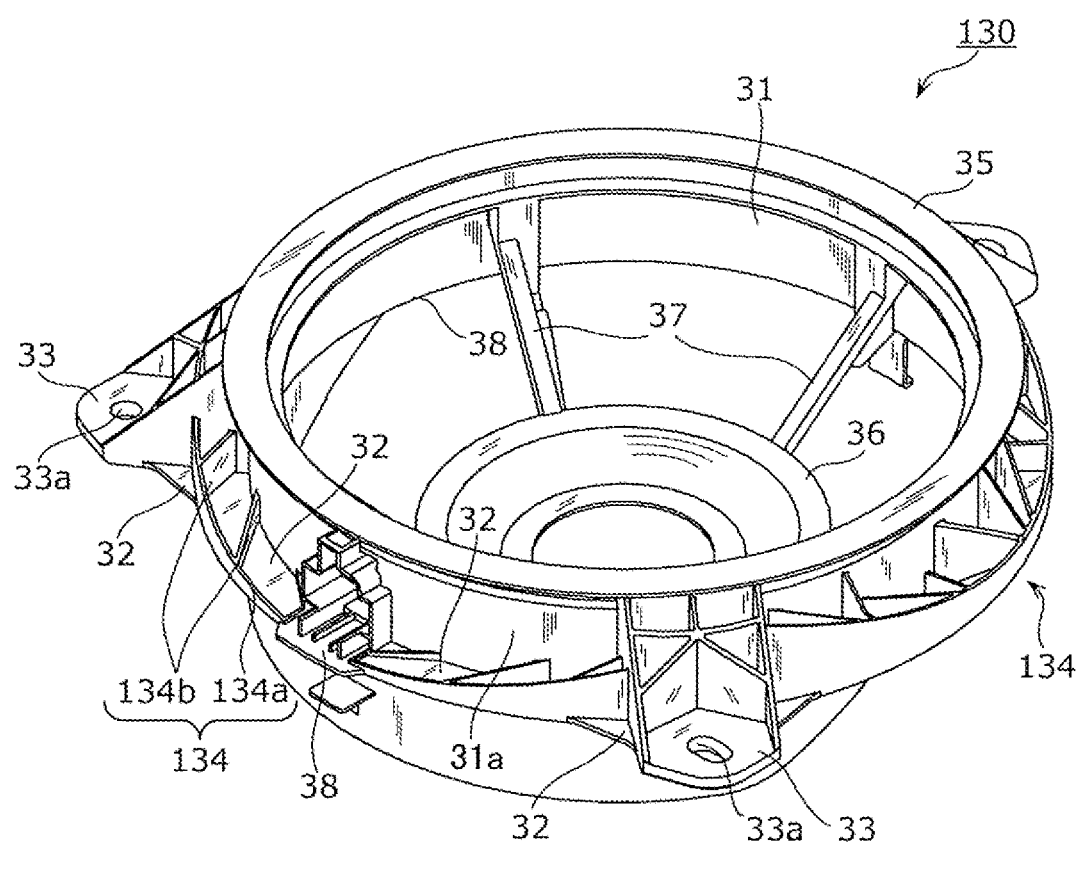
FIG. 14 is a perspective view of the frame as seen at a different angle than in FIG. 12.

As illustrated in FIGS. 12 to 14, each of reinforcement parts 134 includes wall part 134a and a plurality of plate parts 134b. Each of plate parts 134b extends across between wall part 134a and first support part 31. In other words, in reinforcement part 134, the space between first support part 31 and wall part 134a is partitioned by plate parts 134b. In this way, reinforcement part 134 includes spaces partitioned by plate parts 134b. In short, reinforcement part 134 has a hollow structure. Note that wall part 134a itself has a solid structure. Furthermore, each of plate parts 134b itself has a solid structure.

Wall part 134a in the form of a curved plate is erected on pedestal part 32 outside of first support part 31 and faces first support part 31. Wall part 134a has a shape following the outer peripheral surface of first support part 31.

Each of plate parts 134b is fixed to first support part 31, pedestal part 32, and wall part 134a to cross first support part 31, pedestal part 32, and wall part 134a. Plate parts 134b are arranged side by side along the outer periphery of first support part 31.

Next, the shape of reinforcement parts 134 as seen from the side (orthogonally to the Z axis) will be described with reference to FIGS. 15 and 16.

Figure 15:
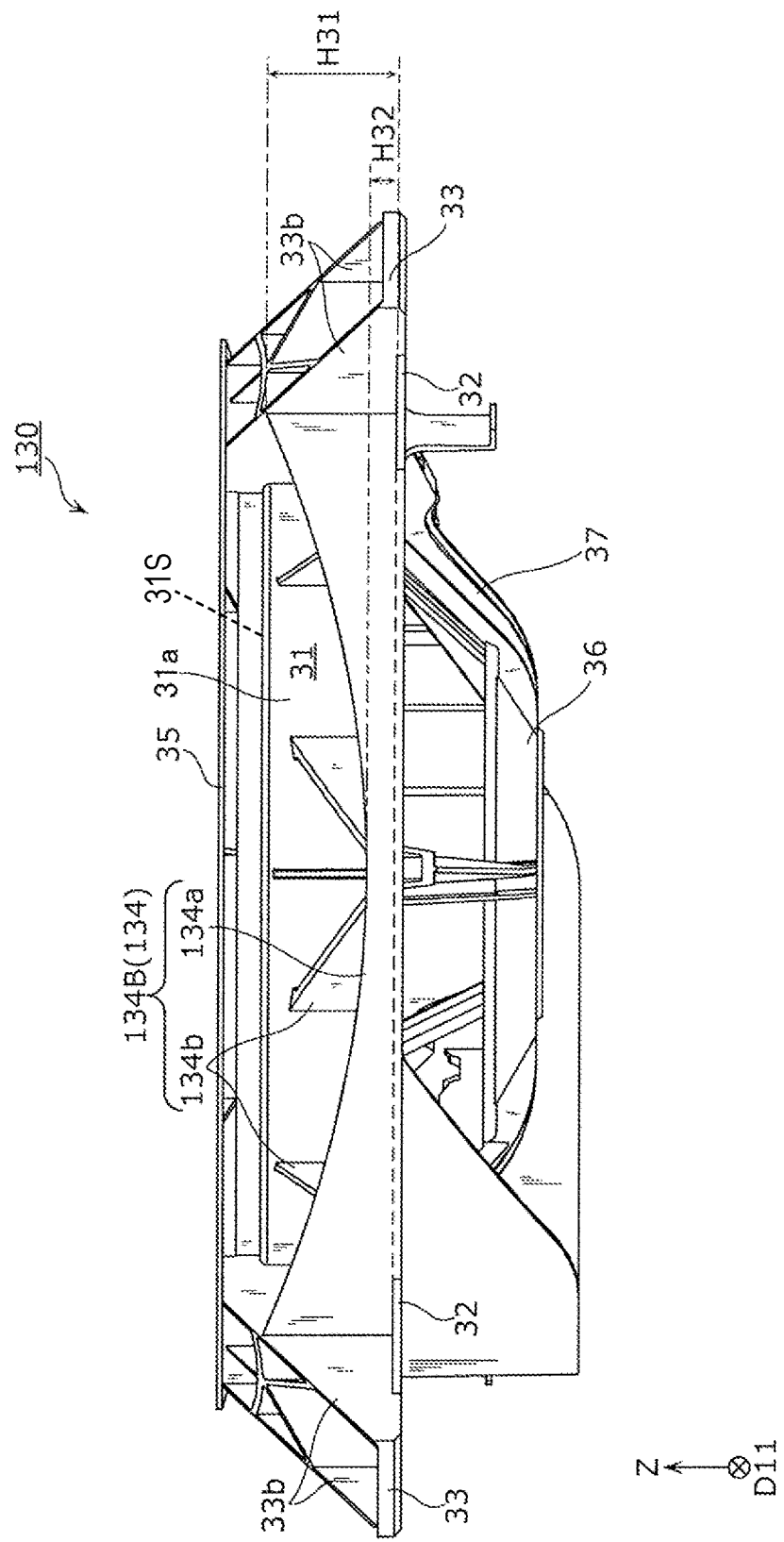
FIG. 15 is a side view of the frame as seen along a first visual line D11 in FIG. 13.

FIG. 15 is a side view of frame 130 as seen along the first visual line D11 in FIG. 13. FIG. 16 is a side view of frame 130 as seen along the second visual line D12 in FIG. 13.

Figure 16:
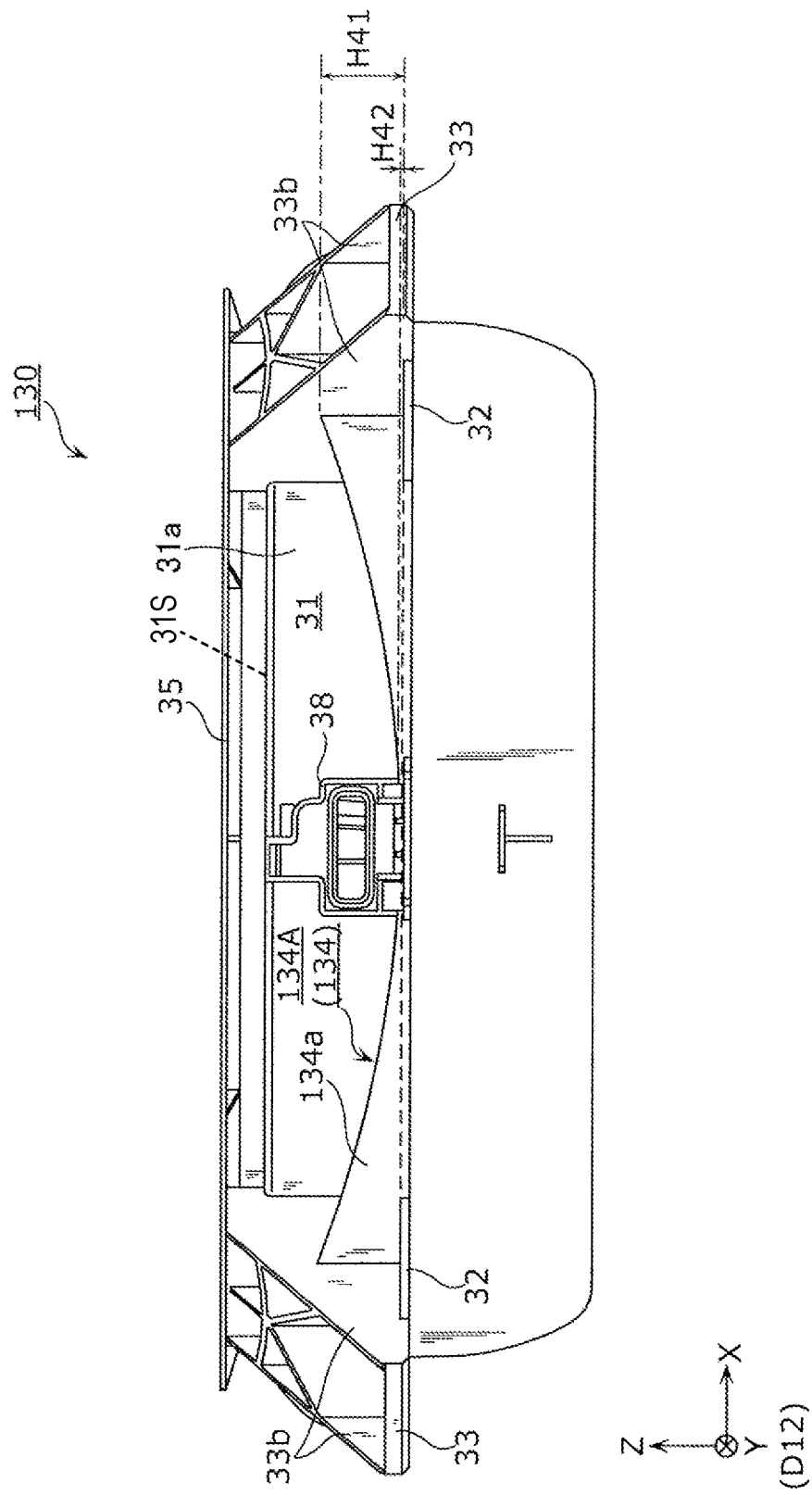
FIG. 16 is a side view of the frame as seen along a second visual line D12 in FIG. 13.

As illustrated in FIGS. 15 and 16, wall part 134a is recessed from abutment surface 35 of first support part 31 toward pedestal part 32. In other words, the shape of the edge of wall part 134a on the positive side of the Z axis is a curved shape protruding on the negative side of the Z axis. Thus, in the region between pedestal part 32 and support surface 31S, reinforcement part 134 has a curved shape protruding on the negative side of the Z axis as seen from the outside of first support part 31.

The both ends of reinforcement part 134 along the outer periphery of first support part 31 are fixed to protrusions 33b of adjacent two of fastening parts 33 disposed on both sides of reinforcement part 134.

As illustrated in FIG. 15, the first parts at the both ends of reinforcement part 134 have first height H31 where the height is defined relative pedestal part 32. On the other hand, the second part of reinforcement part 134 located in the middle between adjacent two of fastening parts 33 has second height H32. Since wall part 134a is recessed from abutment surface 35 of first support part 31 toward pedestal part 32 as described above, first height H31 is greater than second height H32. Likewise, height H41 of the first parts located at the both ends of reinforcement part 134 is greater than height H42 of the second part located in the middle, as illustrated in FIG. 16.

Furthermore, first heights H31, H41 are substantially equal to the height of first support part 31 measured from pedestal part 32. Second heights H32, H42 may be less than or equal to half of first heights H31, H41. First heights H31, H41 are the greatest height among the heights of reinforcement parts 134 measured from pedestal part 32, and second heights H32, H42 are the least height among the heights of reinforcement parts 134 measured from pedestal part 32.

Alternatively, each of reinforcement parts 134 may have a shape extending along the axis of first support part 31 (that is, along the Z axis).

As illustrated in FIGS. 13, 15, and 16, among reinforcement parts 134, first reinforcement part 134A, on which connector part 38 is disposed, and second reinforcement part 134B different from first reinforcement part 134A, on which connector part 38 is not disposed, have different configurations from each other. First reinforcement part 134A is disposed between first fastening part 33A and second fastening part 33B.

Specifically, plate parts 134b of first reinforcement part 134A are fewer in number than plate parts 134b of second reinforcement part 134B. First height H31 of first reinforcement part 134A is less than first height H41 of second reinforcement part 134B. Thus, the rigidity of first reinforcement part 134A is less than the rigidity of second reinforcement part 134B.

Connector part 38 is disposed on first reinforcement part 134A. Therefore, similar to the first exemplary embodiment, the rigidity of each reinforcement part is adjusted so that the total rigidity of first reinforcement part 134A and connector part 38 becomes equal to the rigidity of second reinforcement part 134B. In other words, the plurality of regions in pedestal part 32 that are located between each adjacent two of fastening parts 33 have substantially equal rigidity.

2-2. Advantageous Effects, Etc.

In frame 130 of the loudspeaker unit according to the present exemplary embodiment, each of reinforcement parts 134 further includes wall part 134a which is erected on pedestal part 32 outside of first support part 31 and faces first support part 31. Plate parts 134b are disposed between first support part 31 and wall part 134a and are fixed to wall part 134a so as to cross wall part 134a.

With this configuration, each of reinforcement parts 134 has a hollow structure formed by wall part 134a facing first support part 31 and plate parts 134b disposed between first support part 31 and wall part 134a. Thus, frame 130 has sufficient strength at pedestal part 32.

Alternatively, each of reinforcement parts 134 may have a shape extending along the axis of first support part 31 (that is, along the Z axis).

For example, a die shaped substantially parallel to the axis of first support part 31 (the Z axis) may be used to form frame 130 by resin molding. Consequently, frame 130 can be more easily formed by resin molding.

Modification Examples 3-1. Modification 1

In the first and second exemplary embodiments, each of reinforcement parts 34 or 134 has, on the positive side of the Z axis, a curved shape protruding on the negative side of the Z axis as seen from the outside of first support part 31. However, the shape of each of the reinforcement parts is not limited to this example. For example, instead of curved plate part 34a, two flat plate parts coupled together in the form of an open V-shape or a flat plate part bent in the form of an open V-shape may be used and disposed in such a way that the vertex thereof faces pedestal part 32. In other words, it is possible to employ, on the positive side of the Z axis, reinforcement parts each having a valley shape protruding on the negative side of the Z axis as seen from the outside of first support part 31. The valley shape herein means a shape formed by two planes crossing in such a way as to protrude on the negative side of the Z axis.

3-2. Modification 2

In the first exemplary embodiment, first heights H11, H21 at the both ends of each of reinforcement parts 34, measured from pedestal part 32, are greater than second heights H12, H22 of portions of respective reinforcement parts 34 located between adjacent two of fastening parts 33, measured from pedestal part 32. However, portions having the first heights and the second heights are not limited to this example. Specifically, the structure of the reinforcement part is not limited to the above-described structure as long as the structure includes a first portion having a first height relative to pedestal part 32, and a second portion having a second height less than the first height.

For example, the reinforcement part may have such a structure that a central portion of the reinforcement part is greater in height than both ends thereof, that is, a curved shape protruding on the positive side of the Z axis or a mountain-like shape protruding on the positive side of the Z axis. The mountain-like shape protruding on the positive side of the Z axis indicates a shape formed by two planes crossing to form a protrusion on the positive side of the Z axis.

3-3. Modification 3

In the first exemplary embodiment, the value of first heights H11, H21 of the both ends of each of reinforcement parts 34 is the greatest of the height of reinforcement parts 34 measured from pedestal part 32, but this is not limiting. Specifically, the height of the both ends of each of reinforcement parts 34 does not need to be the greatest; the height of a point thereof offset from the both ends may be the greatest or the height of the middle thereof may be the greatest.

Furthermore, the value of second heights H12, H22 of the middles of respective reinforcement parts 34 is the lowest of the heights of reinforcement parts 34 measured from pedestal part 32, but this is not limiting. Specifically, each of reinforcement parts 34 does not need to be the lowest in the middle and may be the lowest in a position offset from the middle or may be the lowest at both ends.

3-4. Modification 4

Furthermore, in the first and second exemplary embodiments, reinforcement part 34 or reinforcement part 134 is formed extending across each of the plurality of regions between adjacent two of fastening parts 33, but the reinforcement part does not need to be formed across the entire width of the region. For example, the both ends of the reinforcement part do not need to be fixed to the adjacent two of fastening parts 33.

3-5. Modification 5

In the first exemplary embodiment, changing part 31a has a constant thickness across the area from first end opening 31U to second end opening 31L, between adjacent two of connection parts 37. However, this is not limiting. For example, a through-hole or a bottomed recess (depression) may be provided on a portion of changing part 31a with the aim of further weight reduction of loudspeaker unit 100.

Furthermore, although changing part 31a has been described as something that monotonically changes the opening area while maintaining the thickness, the thickness may partially change, for example, with the above-mentioned through-hole or recess or with a thick portion joined to connection part 37.

Figure 17:
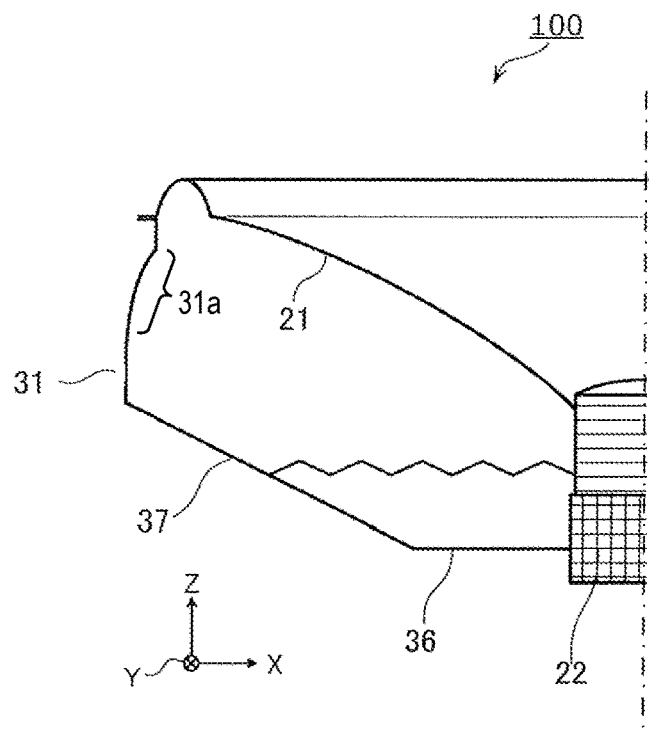
FIG. 17 is a cross-sectional view schematically illustrating a modification example of a changing part in a first support part of the frame illustrated in FIG. 9.

Changing part 31a may be a portion of first support part 31, as illustrated in FIG. 17, instead of extending across whole first support part 31.

Figure 18:
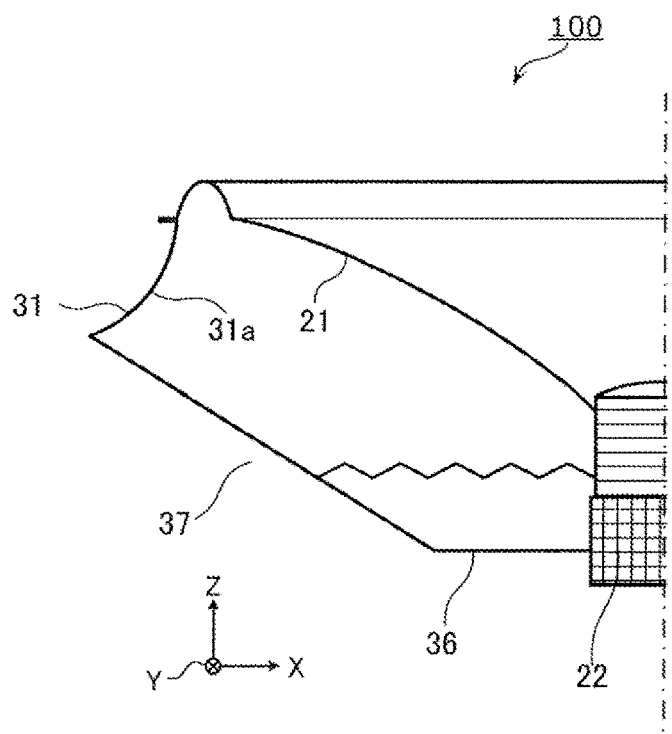
FIG. 18 is a cross-sectional view schematically illustrating another modification example of the changing part.

3-6. Modification 6 The shape of changing part 31a may bulge inward, as illustrated in FIG. 18. In this case, the center of curvature is located exteriorly of changing part 31a.

3-7. Modification 7

Figure 19:
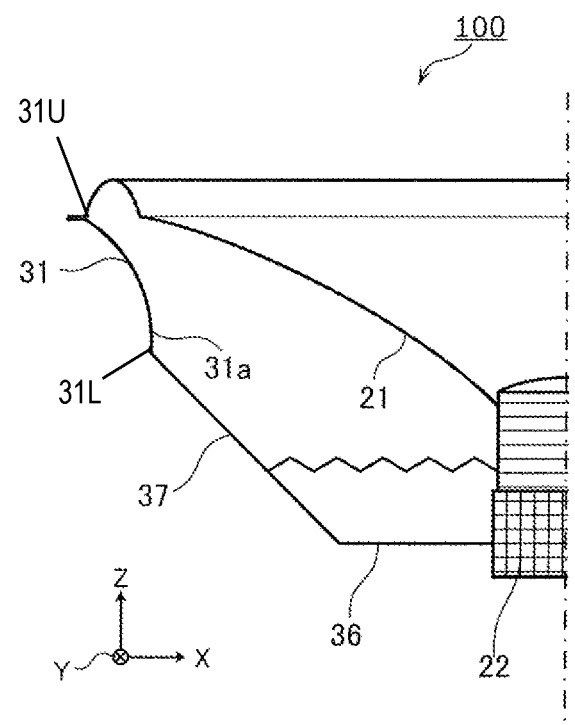
FIG. 19 is a cross-sectional view schematically illustrating yet another modification example of the changing part.

As illustrated in FIG. 19, the opening area of changing part 31a may be smaller in a position close to second end opening 31L at which magnetic circuit 22 is supported than in a position close to first end opening 31U where diaphragm 21 is mounted.

3-8. Modification 8

In the first exemplary embodiment, the gap having width h3 is provided between first connection portion 37a and abutment surface 35 which is the end of first support part 31 on the positive side of the Z axis, but this is not limiting. For example, connection part 37 may be connected to first support part 31 in the state where there is no gap between first connection portion 37a and abutment surface 35. In other words, connection part 37 may be connected to the inner peripheral surface of first support part 31 over the entire width along the Z axis. In this case, diaphragm 21 preferably has an up-roll shape. With this configuration, connection part 37 unlikely interferes with diaphragm 21.

On the other hand, when there is the gap between connection part 37 and abutment surface 35, diaphragm 21 may have a down-roll shape. In the case where the gap is provided, connection part 37 does not interfere with diaphragm 21 even if diaphragm 21 has a down-roll shape.

Third Exemplary Embodiment

Figure 20:
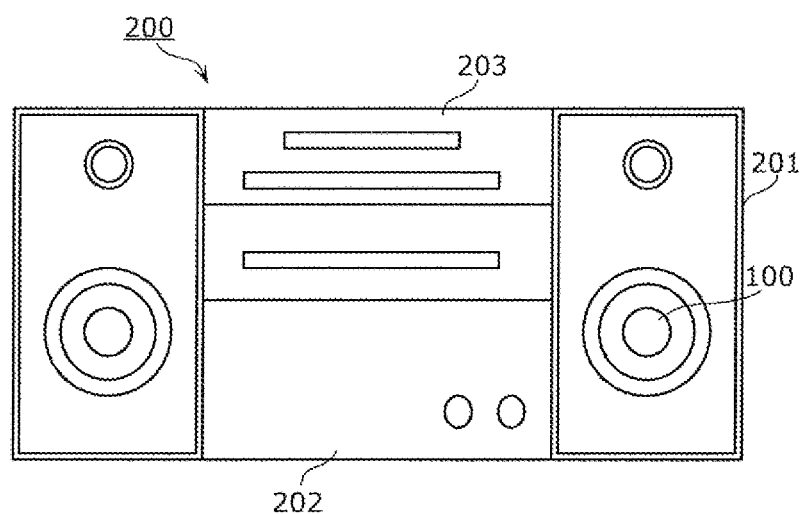
FIG. 20 is an external view of an audio stereo component system which is an electronic device according to a third exemplary embodiment of the present disclosure.

Next, one example of electronic devices including loudspeaker unit 100 will be described with reference to FIG. 20. FIG. 20 is an external view of an audio stereo component system which is an electronic device according to the present exemplary embodiment.

A loudspeaker system is formed by installing loudspeaker unit 100 into enclosure 201. Stereo component system 200 includes this loudspeaker system, amplifier 202, and player 203. Amplifier 202 is an amplifying unit which amplifies an electrical signal to be input to loudspeaker unit 100. Player 203 outputs a source to be input to amplifier 202. Thus, stereo component system 200 includes loudspeaker unit 100, and amplifier 202 which is a circuit part that inputs an electrical signal to loudspeaker unit 100.

This configuration results in the electronic device that can contribute to protection of the global environment by way of weight reduction, resource saving, etc.

Furthermore, since the frame has enough strength, deformation occurring at the time of mounting, mounting distortion, etc., can be significantly reduced, and thus it is possible to provide a low-cost, high-quality, and reliable electronic device. Accordingly, it is possible to produce significant advantageous effects including weight reduction, resource saving, cost reduction, high quality and high reliability of the electronic device.

Note that instead of loudspeaker unit 100 according to the first exemplary embodiment, the loudspeaker unit including frame 130 described in the second exemplary embodiment may be used.

Fourth Exemplary Embodiment

Figure 21:
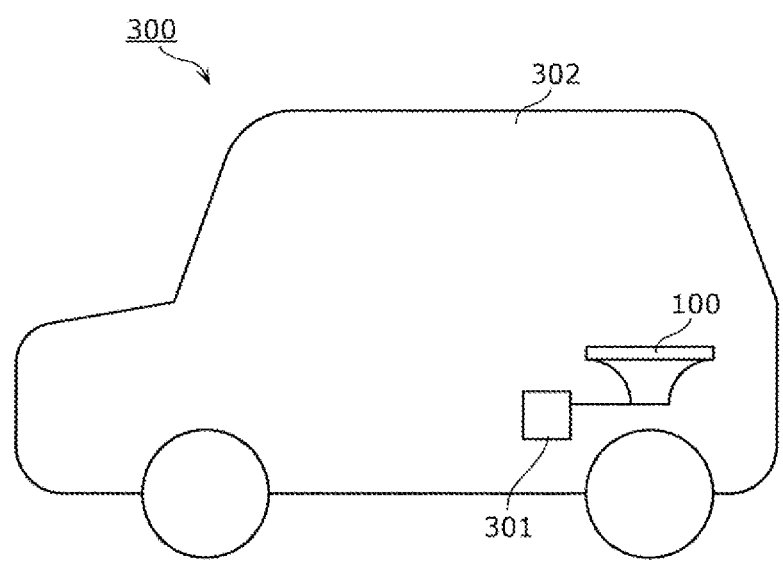
FIG. 21 is a cross-sectional view of an automobile which is a movable-body apparatus according to a fourth exemplary embodiment of the present disclosure.

Next, one example of a movable-body apparatus including loudspeaker unit 100 will be described with reference to FIG. 21. FIG. 21 is a cross-sectional view of an automobile which is a movable-body apparatus according to the present exemplary embodiment.

Automobile 300 is configured in such a way that loudspeaker unit 100 is built in a rear tray, a front panel, or the like and used as a part of a car navigation system, a car audio system, or the like. The car navigation system, the car audio system, or the like includes circuit part 301 which inputs an electrical signal to a loudspeaker. Thus, automobile 300 which is a movable-body apparatus includes loudspeaker unit 100, circuit part 301 which inputs an electrical signal to loudspeaker unit 100, and main body 302 which is capable of self-propelling and to which loudspeaker unit 100 and circuit part 301 are mounted.

The position on automobile 300 to which loudspeaker unit 100 is mounted is not limited to the rear tray, the front panel, or the like and may be any position including a door, the ceiling, a pillar part, an instrument panel part, and the floor.

This configuration results in a movable-body apparatus that can contribute to protection of the global environment by improving the fuel efficiency of the movable-body apparatus through weight reduction, resource saving, etc. Furthermore, since the frame has enough strength, deformation occurring at the time of mounting, mounting distortion, etc., can be significantly reduced, and thus it is possible to provide a low-cost, high-quality, and reliable movable-body apparatus. Accordingly, it is possible to produce significant advantageous effects including weight reduction, resource saving, cost reduction, high quality and high reliability of the movable-body apparatus.

Note that instead of loudspeaker unit 100 according to the first exemplary embodiment, the loudspeaker unit including frame 130 described in the second exemplary embodiment may be used.

The loudspeaker units according to various aspects of the present disclosure have herein been described based on the exemplary embodiments, but the present disclosure is not limited to these exemplary embodiments. Various modifications of the present exemplary embodiments as well as the exemplary embodiments resulting from combinations of structural elements in different exemplary embodiments that may be conceived by those skilled in the art may be included within the scope of one or more aspects of the present disclosure as long as these do not depart from the essence of the present disclosure.

INDUSTRIAL APPLICABILITY

The present disclosure is useful as a loudspeaker unit which can be sufficiently lightweight and an electronic device and a movable-body apparatus each of which includes the loudspeaker unit.

REFERENCE MARKS IN THE DRAWINGS 10 first elastic member
20 loudspeaker main body
21 diaphragm
22 magnetic circuit
30, 130 frame
31 first support part
31a changing part
31S support surface
32 pedestal part
33 fastening part
33A first fastening part
33B second fastening part
33a through-hole
33b protrusion
34, 134 reinforcement part
34A, 134A first reinforcement part
34B, 134B second reinforcement part
34a curved plate part
34b, 134b plate part
35 abutment surface
36 second support part
37 connection part
37a first connection portion
37b second connection portion
37c first portion
37d second portion
38 connector part
40 second elastic member
51 first rib (rib)
52 second rib (rib)
53 third rib (rib)
54 fourth rib (rib)
55 recess
100 loudspeaker unit
110 external casing
111 opening
112 through-hole
134a wall part
200 stereo component system
201 enclosure
202 amplifier
203 player
300 automobile
301 circuit part
302 main body

What is claimed is:

1. A loudspeaker unit comprising:
a frame;
a diaphragm having an inner periphery and an outer periphery; and
a magnetic circuit coupled to the frame,
wherein the frame includes:
a first support part which supports the outer periphery of the diaphragm;
a second support part which supports the magnetic circuit;
a pedestal part which spreads outward from an outer periphery of the first support part; and
a plurality of reinforcement parts disposed side by side along a periphery of the pedestal part and fixed to the outer periphery of the first support part and the pedestal part, each of the plurality of reinforcement parts including:
a first portion having a first height relative to the pedestal part; and
a second portion having a second height lower than the first height, wherein
each of the plurality of reinforcement parts includes a plurality of plate parts disposed side by side along the outer periphery of the first support part and fixed to the first support part and the pedestal part so as to cross the first support part and the pedestal part,
each of the plurality of the reinforcement parts further includes a curved plate part in a form of a curved plate facing the pedestal part, and
each of the plurality of the plate parts is disposed between the pedestal part and the curved plate part and fixed to the curved plate part so as to cross the curved plate part.

2. The loudspeaker unit according to claim 1,
wherein the frame further includes a plurality of fastening parts disposed on respective positions of the pedestal part, the respective positions surrounding the outer periphery of the first support part, and
the plurality of reinforcement parts are disposed on regions of the pedestal part, respectively, each of the regions being located between adjacent two of the plurality of fastening parts.

3. The loudspeaker unit according to claim 2,
wherein the plurality of fastening parts include a first fastening part and a second fastening part,
the plurality of reinforcement parts include a first reinforcement part and a second reinforcement part different from the first reinforcement part, the first reinforcement part being disposed between the first fastening part and the second fastening part,
the frame further includes a connector part to which a wire for inputting an audio signal to the loudspeaker unit is connected, the connector part being disposed between the first fastening part and the second fastening part, and
the first reinforcement part has a lower rigidity than a rigidity of the second reinforcement part.

4. The loudspeaker unit according to claim 1,
wherein the first support part of the frame includes:
a first end opening at which the outer periphery of the diaphragm is supported;

a second end opening at which the magnetic circuit is supported via the second support part; and
a changing part which monotonically changes an opening area of the first support part from the first end opening toward the second end opening.

5. The loudspeaker unit according to claim 4,
wherein the changing part has a shape bulging outward.

6. The loudspeaker unit according to claim 4,
wherein the changing part is curved from the first end opening toward the second end opening at a predetermined rate of curvature centered exteriorly of the changing part.

7. The loudspeaker unit according to claim 1,
wherein the first support part of the frame has a cylindrical shape surrounding the outer periphery of the diaphragm,
the second support part of the frame is disposed inward of the first support part,
the frame further includes a plurality of connection parts which connect the first support part and the second support part,
each of the plurality of connection parts includes a first connection portion and a second connection portion, the first connection portion being connected to the first support part, the second connection portion being connected to the second support part,
each of the plurality of connection parts has a width along a first direction parallel to a central axis of the first support part, the width increasing from the second support part toward the first support part, and
a first width of the first connection portion in the first direction is greater than a second width of the second connection portion in the first direction.

8. The loudspeaker unit according to claim 7,
wherein the first support part includes a first end and a second end in the first direction, the second end being closer to the second support part than the first end is, and
a gap is formed between the first connection portion and the first end of the first support part.

9. The loudspeaker unit according to claim 7,
wherein each of the plurality of connection parts extends along a radius of the diaphragm and includes,
a first portion extending along the radius of the diaphragm,
a first rib erected from the first portion in a first rotation direction along the outer periphery of the diaphragm, the first rib extending along the radius of the diaphragm,
a second portion closer to the pedestal part than the first portion is in the first direction, and
a second rib erected from the second portion in a second rotation direction opposite to the first rotation direction, the second rib extending along the radius of the diaphragm.

10. The loudspeaker unit according to claim 9,
wherein each of the plurality of connection parts further includes a third rib erected toward the pedestal part from the first rib in the first direction, the third rib extending along the radius of the diaphragm.

11. An electronic device comprising:
the loudspeaker unit according to claim 1; and
circuitry configured to input an electrical signal to the loudspeaker unit.

12. A movable-body apparatus comprising:
the loudspeaker unit according to claim 1;

circuitry configured to input an electrical signal to the loudspeaker unit; and
a body which is capable of self-propelling and to which the loudspeaker unit and the circuitry are mounted.

13. A loudspeaker unit comprising:
a frame;
a diaphragm having an inner periphery and an outer periphery; and
a magnetic circuit coupled to the frame,
wherein the frame includes:
a first support part which supports the outer periphery of the diaphragm;
a second support part which supports the magnetic circuit;
a pedestal part which spreads outward from an outer periphery of the first support part; and
a plurality of reinforcement parts disposed side by side along a periphery of the pedestal part and fixed to the outer periphery of the first support part and the pedestal part, each of the plurality of reinforcement parts including:
a first portion having a first height relative to the pedestal part; and
a second portion having a second height lower than the first height, wherein
each of the plurality of reinforcement parts includes a plurality of plate parts disposed side by side along the outer periphery of the first support part and fixed to the first support part and the pedestal part so as to cross the first support part and the pedestal part,
each of the plurality of reinforcement parts further includes a wall part erected on the pedestal part outside of the first support part and facing the first support part, and
the plurality of plate parts are disposed between the first support part and the wall part and fixed to the wall part so as to cross the wall part.

14. The loudspeaker unit according to claim 13,
wherein the first support part of the frame includes:
a first end opening at which the outer periphery of the diaphragm is supported;
a second end opening at which the magnetic circuit is supported via the second support part; and
a changing part which monotonically changes an opening area of the first support part from the first end opening toward the second end opening.

15. The loudspeaker unit according to claim 13,
wherein the first support part of the frame has a cylindrical shape surrounding the outer periphery of the diaphragm,
the second support part of the frame is disposed inward of the first support part,
the frame further includes a plurality of connection parts which connect the first support part and the second support part,
each of the plurality of connection parts includes a first connection portion and a second connection portion, the first connection portion being connected to the first support part, the second connection portion being connected to the second support part,
each of the plurality of connection parts has a width along a first direction parallel to a central axis of the first support part, the width increasing from the second support part toward the first support part, and
a first width of the first connection portion in the first direction is greater than a second width of the second connection portion in the first direction.

16. An electronic device comprising:
the loudspeaker unit according to claim 13; and
circuitry configured to input an electrical signal to the loudspeaker unit.

17. A movable-body apparatus comprising:
the loudspeaker unit according to claim 13;
circuitry configured to input an electrical signal to the loudspeaker unit; and
a body which is capable of self-propelling and to which the loudspeaker unit and the circuitry are mounted.

* * * * *